US012080239B2

(12) United States Patent
Chung et al.

(10) Patent No.: US 12,080,239 B2
(45) Date of Patent: Sep. 3, 2024

(54) DISPLAY DEVICE PERFORMING CHARGE SHARING

(71) Applicant: SAMSUNG ELECTRONICS CO., LTD., Suwon-si (KR)

(72) Inventors: Kyunghoon Chung, Suwon-si (KR); Jihoon Kim, Suwon-si (KR); Yongsoo Lee, Suwon-si (KR); Jihyun Lee, Suwon-si (KR); Minje Hyun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/237,515

(22) Filed: Aug. 24, 2023

(65) Prior Publication Data

US 2023/0395029 A1 Dec. 7, 2023

Related U.S. Application Data

(63) Continuation of application No. 17/519,704, filed on Nov. 5, 2021, now Pat. No. 11,776,473.

(30) Foreign Application Priority Data

Mar. 24, 2021 (KR) ........................ 10-2021-0037763

(51) Int. Cl.
*G09G 3/3233* (2016.01)
*G09G 3/36* (2006.01)

(52) U.S. Cl.
CPC ......... *G09G 3/3233* (2013.01); *G09G 3/3648* (2013.01); *G09G 2300/0452* (2013.01); *G09G 2300/0842* (2013.01); *G09G 2310/0202* (2013.01); *G09G 2310/0243* (2013.01); *G09G 2310/08* (2013.01); *G09G 2330/021* (2013.01)

(58) Field of Classification Search
None
See application file for complete search history.

(56) References Cited

U.S. PATENT DOCUMENTS 8,674,976 B2 3/2014 Kim
9,275,583 B2 3/2016 Kim
9,361,846 B2 6/2016 Ryu et al.
9,449,557 B2 9/2016 Kim
(Continued)

FOREIGN PATENT DOCUMENTS

KR 10-2004-0070513 A 8/2004
KR 10-1971447 B1 8/2019
KR 10-2090607 B1 3/2020

*Primary Examiner* — Matthew Yeung
(74) *Attorney, Agent, or Firm* — Sughrue Mion, PLLC

(57) ABSTRACT

A display device includes: a charge sharing controller to generate the plurality of group switch control signals based on first bits of (K−1)th digital data groups and second bits of digital data groups. The (K−1)th digital data groups correspond to pixel values of a (K−1)th row of the display panel. The Kth data digital groups correspond to pixel values of a Kth row of the display panel. The charge sharing controller is configured to, with respect to each of the plurality of source line groups, activate each of the plurality of group switch control signals to perform the charge sharing in response to the first bits satisfying a first condition, and the first bits and the second bits satisfying a second condition. The first bits and the second bits are not compared to each other to output a count value.

20 Claims, 18 Drawing Sheets

(56) References Cited

U.S. PATENT DOCUMENTS

| | | | |
|---|---|---|---|
| 9,558,698 | B2 | 1/2017 | Chen et al. |
| 2009/0207118 | A1 | 8/2009 | Lee et al. |
| 2011/0069088 | A1 | 3/2011 | Weng et al. |
| 2014/0320464 | A1 | 10/2014 | Ryu |
| 2016/0035301 | A1 | 2/2016 | Neugebauer |

| | CONSUMPTION CURRENT |
|---|---|
| CHAGE SHARING OFF | 22.9 mA |
| CHAGE SHARING ON | 19.5 mA |

131'a

131'b

131c

DISPLAY DEVICE PERFORMING CHARGE SHARING

CROSS-REFERENCE TO RELATED APPLICATION

This application is a continuation application of U.S. application Ser. No. 17/519,704, filed on Nov. 5, 2021, which claims priority from Korean Patent Application No. 10-2021-0037763, filed on Mar. 24, 2021, in the Korean Intellectual Property Office (KIPO), the disclosures of which are incorporated herein in their entirety by reference.

BACKGROUND

1. Field

Embodiments relate to semiconductor integrated circuits, and more particularly, to a display device performing charge sharing.

2. Discussion of the Related Art

As a display device, a liquid crystal display (LCD), an organic light emitting display (OLED), etc. are widely used. Recently, as a size and a resolution of a display panel included in the display device increases, power consumption in the display device increases.

SUMMARY

Some embodiments may provide display device, capable of reducing consumption current and hardware resources for performing the charge sharing.

According to embodiments, a display device includes a display panel, a plurality of switch circuits and a charge sharing controller. The display panel includes a plurality of pixels which are connected to a plurality of gate lines and a plurality of source lines and are arranged in a plurality of rows and a plurality of columns. The plurality of source lines are divided into a plurality of source line groups. The plurality of switch circuit electrically connect source lines included in each of the plurality of source line groups based on each of a plurality of group switch control signals to perform charge sharing. The charge sharing controller generates each of the plurality of group switch control signals based on first most significant bits (MSBs) of each of a plurality of $(K-1)^{th}$ digital data groups and second MSBs of each of a plurality of $K^{th}$ digital data groups. The plurality of $(K-1)^{th}$ digital data groups correspond to pixel values of a $(K-1)^{th}$ row of the display panel, the plurality of $K^{th}$ data digital groups correspond to pixel values of a $K^{th}$ row of the display panel, where K is a natural number greater than one.

According to embodiments, a display device includes a display panel and a display driver integrated circuit. The display panel includes a plurality of pixels which are connected to a plurality of gate lines and a plurality of source lines and are arranged in a plurality of rows and a plurality of columns. The plurality of source lines are divided into a plurality of source line groups. The display driver integrated circuit drives the display panel. The display driver integrated circuit includes a plurality of switch circuits, a data latch circuit and a charge sharing controller. The plurality of switch circuits electrically connect source lines included in each of the plurality of source line groups based on each of a plurality of group switch control signals to perform charge sharing. The data latch circuit outputs a plurality of $(K-1)^{th}$ digital data groups corresponding to pixel values of a $(K-1)^{th}$ row of the display panel, and a plurality of $K^{th}$ digital data groups corresponding to pixel values of a $K^{th}$ row of the display panel, where K is a natural number greater than one. The charge sharing controller generates each of the plurality of group switch control signals based on MSBs of each of the plurality of $(K-1)^{th}$ digital data groups and second MSBs of each of the plurality of $K^{th}$ digital data groups.

According to embodiments, a display device includes a display panel, a plurality of switch circuits and charge sharing controller. The display panel includes a plurality of pixels which are connected to a plurality of gate lines and a plurality of source lines and are arranged in a plurality of rows and a plurality of columns. The plurality of source lines are divided into a plurality of source line groups. The plurality of switch circuits electrically connect source lines included in each of the plurality of source line groups based on each of a plurality of group switch control signals to perform charge sharing. Each of the plurality of switch circuits includes a plurality of first switches performing the charge sharing. The charge sharing controller generates each of the plurality of group switch control signals based on first MSBs of each of a plurality of $(K-1)^{th}$ digital data groups, second MSBs of each of a plurality of $K^{th}$ digital data groups, third MSBs which are the first MSBs corresponding to selected columns of the display panel, and fourth MSBs which are the second MSBs corresponding to the selected columns of the display panel, where K is a natural number greater than one.

The display device according to embodiments may electrically connect source lines included in each of the plurality of source line groups to perform the charge sharing based on the digital data corresponding to each of the plurality of source line groups, the plurality of group switch control signals and the plurality of switch circuits. The charge sharing may be performed based on parasitic capacitances formed in the source lines included in each of the plurality of source line groups. The display device may perform the charge sharing without additional data other than the input digital data for displaying an image on the display panel. The display device may perform the charge sharing using general components for performing an original function of the display device without additional components other than the charge sharing controller and the plurality of first switches.

BRIEF DESCRIPTION OF DRAWINGS

Example embodiments of the disclosure will be more clearly understood from the following detailed description taken in conjunction with the accompanying drawings.

DETAILED DESCRIPTION OF EMBODIMENTS

Figure 1:
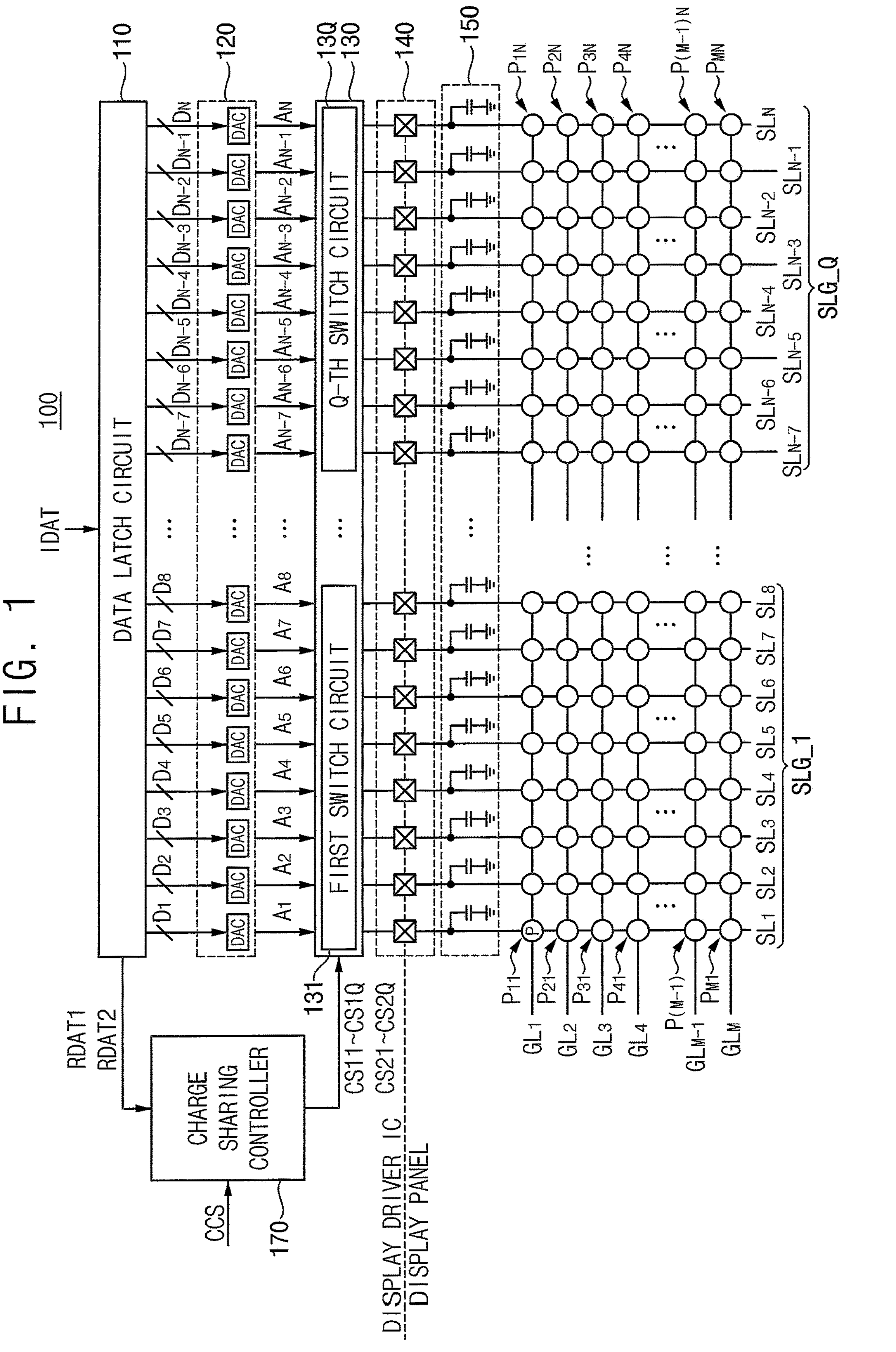
FIG. 1 is a block diagram illustrating a display device, according to embodiments.

Various embodiments will be described more fully hereinafter with reference to the accompanying drawings, in which some embodiments are shown. The embodiments described herein are all example embodiments, and thus, the inventive concept is not limited thereto and may be realized in various other forms. In the drawings, like numerals refer to like elements throughout. The repeated descriptions may be omitted.

FIG. 1 is a block diagram illustrating a display device according to embodiments.

Referring to FIG. 1, a display device 100 may include a display panel, data pads 140 and a display driver integrated circuit (IC). The display panel may be one of an organic light-emitting diode (OLED) panel and a liquid crystal display (LCD) panel or a combination thereof.

The display panel may include a plurality of pixels which are connected to a plurality of gate lines $GL_1$, $GL_2$, $GL_3$, . . . , $GL_{M-1}$, $GL_M$ and a plurality of source lines $SL_1$, $SL_2$, $SL_3$, . . . , $SL_{N-1}$, $SL_N$. The display driver IC may include a data latch circuit 110, a digital-to-analog converter 120, a driving switch circuit 130 and a charge sharing controller 170. The driving switch circuit 130 may include a plurality of switch circuits 131 to 13Q. Here, M, N and Q are each a natural number greater than one.

The plurality of pixels may receive pixel data corresponding to pixel values of the plurality of pixels under a control of the display driver IC to display an image.

In some embodiments, the plurality of pixels may be arranged in a plurality of rows and a plurality of columns. For example, a total of M×N pixels $P_{11}$, $P_{21}$, $P_{31}$, . . . , $P_{(M-1)N}$, $P_{MN}$ may be arranged in M rows and N columns. In this case, a plurality of M gate lines respectively corresponding to the plurality of rows and a plurality of N source lines respectively corresponding to the plurality of columns may be formed. The plurality of pixels may be connected to the plurality of gate lines $GL_1$, $GL_2$, $GL_3$, . . . , $GL_{M-1}$, $GL_M$ and selected in units of rows, and may be connected to the plurality of source lines $SL_1$, $SL_2$, $SL_3$, . . . , $SL_{N-1}$, $SL_N$ to receive the pixel data. In some embodiments, each of the plurality of pixels may represent one or more of a plurality of colors. For example, the plurality of colors may represent one of red, green and blue, however, embodiments are not limited thereto.

The display driver IC may receive input digital data IDAT from outside, generate the pixel data based on the input digital data IDAT, and provide the pixel data to the display panel.

In some embodiments, the data latch circuit 110 may latch the input digital data IDAT to provide digital data $D_1$, $D_2$, $D_3$, . . . , $D_N$ corresponding to at least one of the plurality of rows to the digital-to-analog converter 120. The digital-to-analog converter 120 may convert the digital data $D_1$, $D_2$, $D_3$, . . . , $D_N$ to analog data $A_1$, $A_2$, $A_3$, . . . , $A_N$ and provide the analog data $A_1$, $A_2$, $A_3$, . . . , $A_N$ to the driving switch circuit 130. The driving switch circuit 130 may provide the analog data $A_1$, $A_2$, $A_3$, . . . , $A_N$ as the pixel data to the display panel through the data pads 140.

In some embodiments, the data latch circuit 110 may latch the input digital data IDAT to provide digital data RDAT1 and RDAT2 to the charge sharing controller 170. The digital data RDAT1 may be data corresponding to pixel values of $(K-1)^{th}$ row among the plurality of rows, and the digital data RDAT2 may be data corresponding to pixel values of $K^{th}$ row among the plurality of rows, where K is a natural number greater than one.

The charge sharing controller 170 may receive a charge sharing control signal CCS from a timing controller, and receive the digital data RDAT1 and RDAT2 from the data latch circuit 110. However, embodiments are not limited thereto. In some embodiments, the charge sharing controller 170 may receive the digital data RDAT1 and RDAT2 from the timing controller.

The charge sharing controller 170 may divide the digital data RDAT1 to generate a plurality of $(K-1)^{th}$ digital data groups, and divide the digital data RDAT2 to generate a plurality of $K^{th}$ digital data groups. The charge sharing controller 170 may include a plurality of line memories temporarily storing the plurality of $(K-1)^{th}$ digital data groups and the plurality of $K^{th}$ digital data groups. In this case, each of the plurality of $(K-1)^{th}$ digital data groups and the $K^{th}$ digital data groups may correspond to a plurality of source line groups SLG_1, . . . , SLG_Q, which will be described later. For example, the number of the $(K-1)^{th}$ digital data groups may be substantially the same as the number of the plurality of source line groups SLG_1, . . . , SLG_Q.

The $K^{th}$ digital data groups may also be generated by being divided from the digital data RDAT2 in the same manner as the $(K-1)^{th}$ digital data groups. Hereinafter, it is assumed that the number of the plurality of source line groups SGL_1, . . . , SLG_Q is 'Q', where Q is a natural number greater than one, however, embodiments are not limited thereto.

The charge sharing controller 170 may extract most significant bits (MSBs) from each of the plurality of $(K-1)^{th}$ digital data groups (herein referred to as "first MSBs"), and extract MSBs from each of the plurality of $K^{th}$ digital data groups (herein referred to as "second MSBs").

The charge sharing controller 170 may generate each of a plurality of group switch control signals CS11 to CS1Q and CS21 to CS2Q based on the first MSBs and the second MSBs.

The driving switch circuit 130 may include a plurality of switch circuits (e.g., a first switch circuit 131 to a $Q^{th}$ switch circuit 13Q). Each of the plurality of switch circuits 131 to 13Q may include a plurality of first switches and a plurality of second switches.

The plurality of source lines $SL_1$, $SL_2$, $SL_3$, . . . , $SL_{N-1}$, $SL_N$ may be divided into the plurality of source line groups SGL_1, . . . , SLG_Q, and the plurality of first switches may electrically connect source lines included in each of the plurality of source line groups SLG_1, . . . , SLG_Q to one another based on each of the plurality of group switch control signals CS11 to CS1Q to perform charge sharing.

The plurality of second switches may electrically connect source lines included in each of the plurality of source line groups SLG_1, . . . , SLG_Q to the digital-to-analog converter 120 based on each of the plurality of group switch control signals CS21 to CS2Q.

According to the above configuration, the display device 100 may electrically connect source lines included in each of the plurality of source line groups SLG_1, . . . , SLG_Q to one another to perform the charge sharing based on the digital data RDAT and RDAT2 corresponding to each of the plurality of source line groups SLG_1, . . . , SLG_Q, the plurality of group switch control signals CS11 to CS1Q and the plurality of switch circuits 131 to 13Q. The charge sharing may be performed based on parasitic capacitances formed in the source lines included in each of the plurality of source line groups SLG_1, . . . , SLG_Q. The display device 100 may perform the charge sharing without additional data other than the input digital data IDAT for displaying an image on the display panel. The display device 100 may perform the charge sharing using general components for performing an original function of the display device 100 without additional components other than the charge sharing controller 170 and the plurality of first switches included in each of the plurality of switch circuits 131 to 13Q.

The display device 100 may divide the digital data RDAT1 and RDAT2 to correspond to each of the plurality of source line groups SLG_1, . . . , SLG_Q, generate each of the plurality of group switch control signals CS11 to CS1Q and CS21 to CS2Q, and electrically connect source lines included in each of the plurality of source line groups SLG_1, . . . , SLG_Q to one another. Therefore, each of the plurality of source line groups SLG_1, . . . , SLG_Q becomes a fundamental unit for the display device 100 to perform the charge sharing.

In some embodiments, the number of source lines included in each of the plurality of source line groups SLG_1, . . . , SLG_Q may be substantially the same. For example, among the plurality of source line groups SLG_1, . . . , SLG_Q, a first source line group SLG_1 may include first to eighth source lines $SL_1$ to $SL_8$, a second source line group SLG_2 may include ninth to sixteenth source lines $SL_9$ to $SL_{16}$, and a third source line group SLG_3 may include seventeenth to twenty-fourth source lines $SL_{17}$ to $SL_{24}$. In the same manner, remaining source line groups among the plurality of source line groups SLG_1, . . . , SLG_Q may include remaining source lines among the plurality of source lines $SL_1$, . . . , $SL_{N-1}$, $SL_N$. A $Q^{th}$ source line group SLG_Q corresponding to the last source line group may include $(N-7)^{th}$ to $N^{th}$ source lines $SL_{N-7}$ to $SL_N$. However, the number of the plurality of source line groups SLG_1, . . . , SLG_Q and the number of source lines included in each of the plurality of source line groups SLG_1, . . . , SLG_Q are exemplary, and may be variously changed.

In some embodiments, the plurality of first switches and the plurality of second switches may be periodically turned on for each row unit time interval for driving the display panel row by row. For example, the plurality of first switches may be periodically turned on after a time point at which the plurality of second switches is turned on in the row unit time interval. The plurality of first switches and the plurality of second switches will be described with reference to FIGS. 2A, 2B, 14A, 14B and 17.

In FIG. 1, the display driver IC is illustrated as including only the data latch circuit 110, the digital-to-analog converter 120, the driving switch circuit 130 and the charge sharing controller 170, however embodiments are not limited thereto. In some embodiments, the display driver IC may include a timing controller, a source driver, a scan driver, a power supply circuit and a gamma voltage generating circuit, and the digital-to-analog converter 120, the driving switch circuit 130 and the charge sharing controller 170 may be included in the source driver.

Figure 2A:
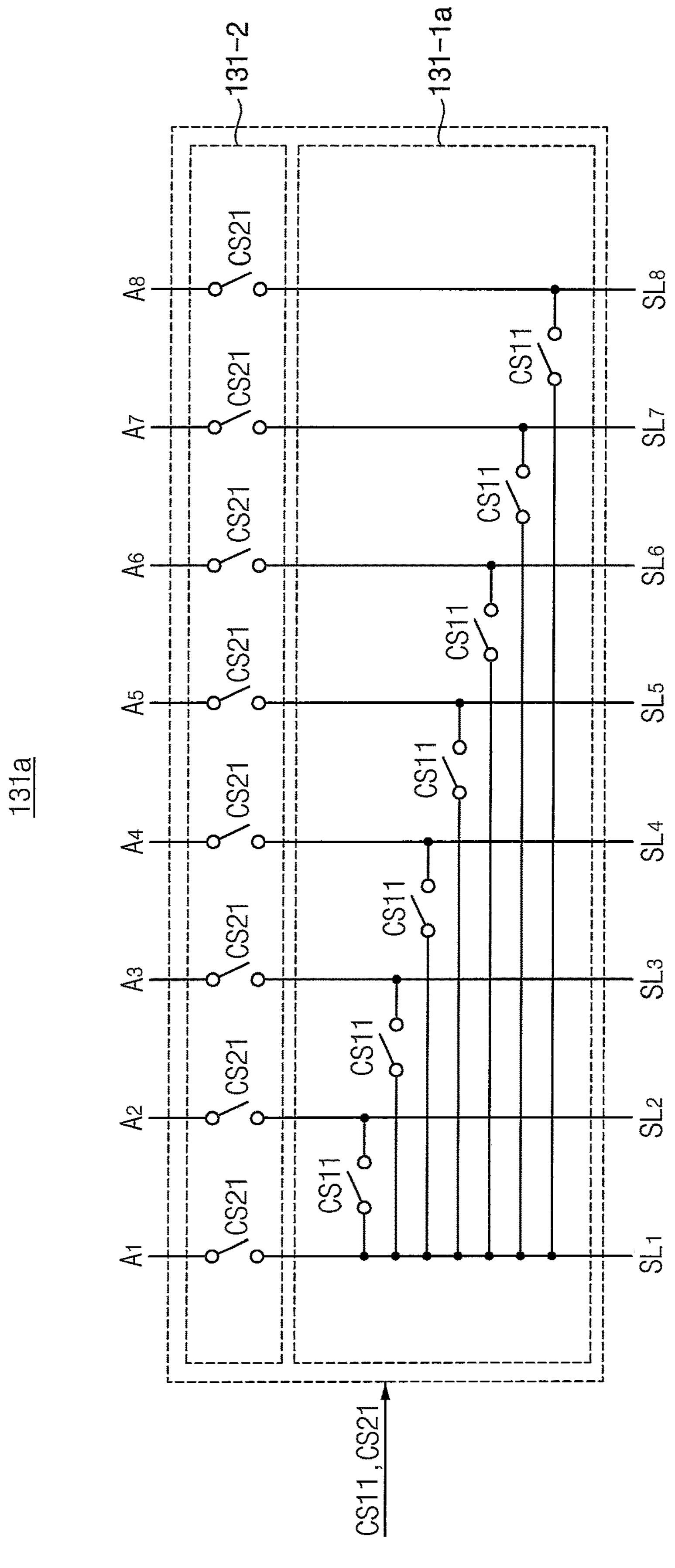
FIGS. 2A and 2B are block diagrams illustrating embodiments of a first switch circuit included in the display device of FIG. 1.
Figure 2B:
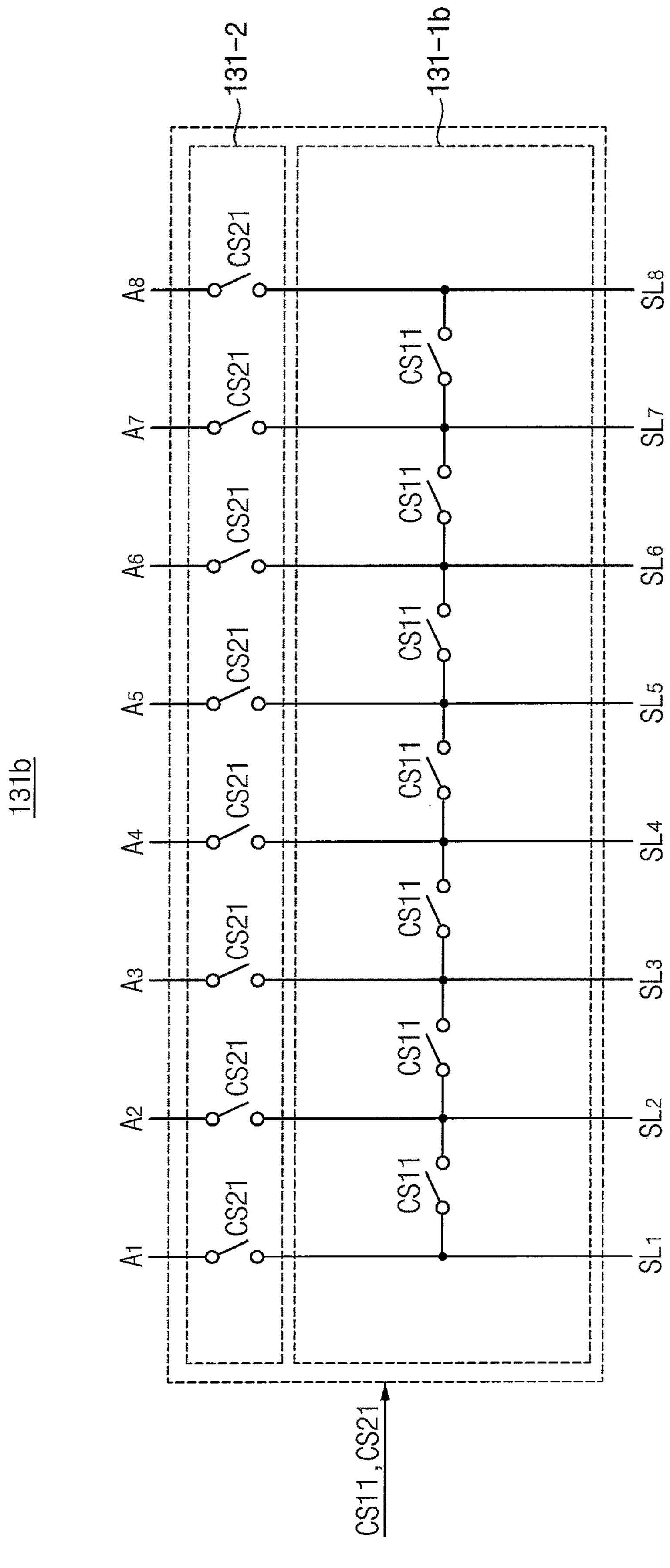

FIGS. 2A and 2B are block diagrams illustrating embodiments of a first switch circuit included in the display device of FIG. 1.

Referring to FIGS. 1 and 2A, a first switch circuit 131*a*, which corresponds to the first switch circuit 131 shown in FIG. 1, may receive analog data $A_1$, $A_2$, $A_3$, . . . , $A_8$ converted from digital data $D_1$, $D_2$, $D_3$, . . . , $D_8$ and provide the analog data $A_1$, $A_2$, $A_3$, . . . , $A_8$ to first to eighth source lines $SL_1$ to $SL_8$ included in first source line group SLG_1, respectively.

The first switch circuit 131*a* may include a plurality of first switches 131-1*a* and a plurality of second switches 131-2.

The plurality of first switches 131-1*a* may connect first to eight source lines $SL_1$ to $SL_8$ included in the first source line group SLG_1 to one another. In some embodiments, the plurality of first switches 131-1*a* may connect a reference source line (e.g., $SL_1$), which is one source line of the source lines included in the first source line group SLG_1, respectively to the other source lines $SL_2$ to $SL_8$ included in the first source line group SLG_1. In FIG. 2A, the first source line $SL_1$ is illustrated as corresponding to the reference source line, however, embodiments are not limited thereto. The plurality of second switches 131-2 may connect first to eight source lines $SL_1$ to $SL_8$ included in the first source line group SLG_1 to the digital-to-analog converter 120 in FIG. 1.

The first switch circuit 131*a* may receive group switch control signals CS11 and CS21 from the charge sharing controller 170 in FIG. 1.

In some embodiments, the plurality of first switches 131-1*a* may be turned on or off based on the group switch control signal CS11, and the plurality of second switches 131-2 may be turned on or off based on the group switch control signal CS21.

In some embodiments, the group switch control signals CS11 and CS21 may be 1-bit signals, and in embodiments in FIG. 2A, the plurality of first switches 131-1*a* may be turned on or off at once, and the plurality of second switches 131-2 may also be turned on or off at once. However, time points at which the plurality of first switches 131-1$a$ and the plurality of second switches 131-2 are turned on may be different from each other.

In FIG. 2A, the first switch circuit 131$a$ is illustrated as an embodiment of the plurality of switch circuits 131 to 13Q included in the driving switch circuit 130 shown in FIG. 1, however, each of the plurality of switch circuits 131 to 13Q may have the same configuration as the first switch circuit 131$a$.

In some embodiments, the plurality of first switches included in each of the plurality of first switch circuits may connect a reference source line, which is one source line of the source lines included in each of the plurality of source line groups SLG_1, . . . , SLG_Q, respectively to the other source lines included in each of the plurality of source line groups SLG_1, . . . , SLG_Q. However, embodiments are not limited thereto. In some embodiments, as illustrated in FIG. 2B, a first switch circuit 131$b$, which corresponds to the first switch circuit 131 shown in FIG. 1, may include a plurality of first switches 131-1$b$ and a plurality of second switches 131-2, and each of the plurality of first switches 131-1$b$ may respectively connect two adjacent source lines among the source lines included in each of the plurality of source line groups SLG_1, . . . , SLG_Q to each other.

Figure 3:
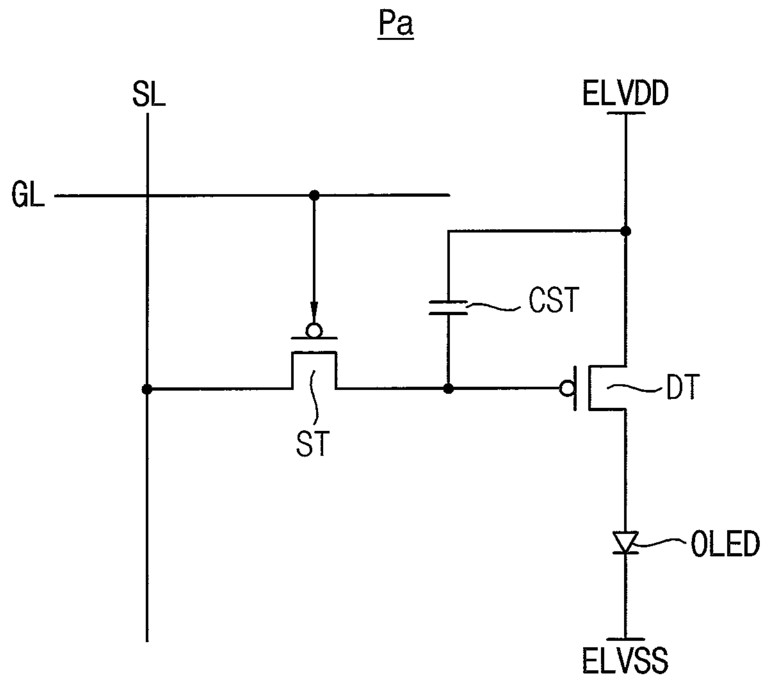
FIGS. 3 and 4 are circuit diagrams illustrating examples of pixels included in the display panel in FIG. 1.
Figure 4:
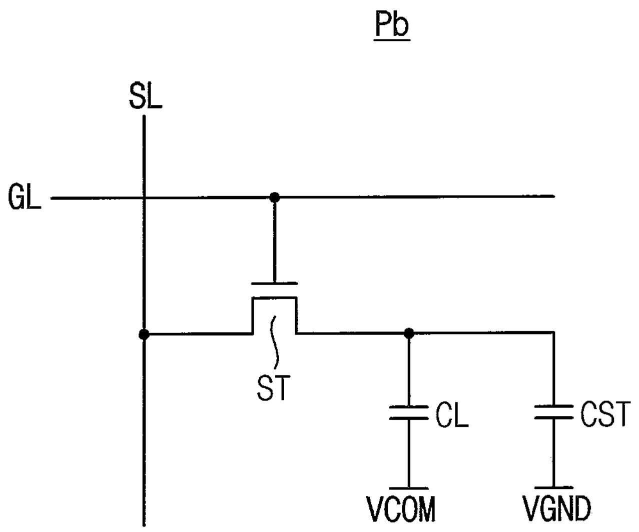

FIGS. 3 and 4 are circuit diagrams illustrating examples of pixels included in the display panel in FIG. 1.

Referring to FIGS. 1 and 3, the display panel of FIG. 1 may be implemented using an electroluminescent (EL) pixel Pa including an organic light emitting diode (OLED). The EL pixel Pa may include a switching transistor ST, a storage capacitor CST, a drive transistor DT and the OLED.

The switching transistor ST may have a first terminal connected to a source line SL or a data line, a second terminal connected to the storage capacitor CST and a gate terminal connected to a gate line GL or a scan line. The switching transistor ST may transmit analog data provided through the source line SL to the storage capacitor CST in response to a gate driving signal applied through the gate line GL.

The storage capacitor CST may have a first electrode connected to a high power voltage ELVDD and a second electrode connected to the gate terminal of the drive transistor DT. The storage capacitor CST may store the analog data transmitted through the switching transistor ST.

The drive transistor DT may have a first terminal connected to the high power voltage ELVDD, a second terminal connected to the OLED and a gate electrode connected to the storage capacitor CST. The drive transistor DT may be turned on or off according to data stored in the storage capacitor CST.

The OLED may have an anode electrode connected to the drive transistor DT and a cathode electrode connected to a low power supply voltage ELVSS. The OLED may emit light based on a current flowing from the high power voltage ELVDD to the low power voltage ELVSS while the drive transistor DT is turned on. Such a simple structure of the pixel PA, e.g., a 2T1C structure of two transistors ST and DT and one capacitor CST, may be more suitable for an enlargement of the display device 100. The EL pixel Pa illustrated in FIG. 3 is merely exemplary, and an EL pixel of various configurations may be used in the display device 100 according to embodiments.

Referring to FIGS. 1 and 4, the display of FIG. 1 may be implemented using a liquid crystal display (LCD) pixel Pb including a liquid crystal capacitor CL. The LCD pixel Pb may include a switching element ST, a liquid crystal capacitor CL and a storage capacitor CST. The switching element ST electrically connects a source line SL and the capacitors CL and CST in response to a gate driving signal applied through a gate line GL. The liquid crystal capacitor CL is coupled between the switching element ST and a common voltage VCOM, and the storage capacitor CST is coupled between the switching element ST and a ground voltage VGND. The liquid crystal capacitor CL may control the amount of transmitted light according to data stored in the storage capacitor CST. The LCD pixel Pb illustrated in FIG. 4 is merely exemplary, and LCD pixel of various configurations may be used in the display device 100 according to embodiments.

Figure 5:
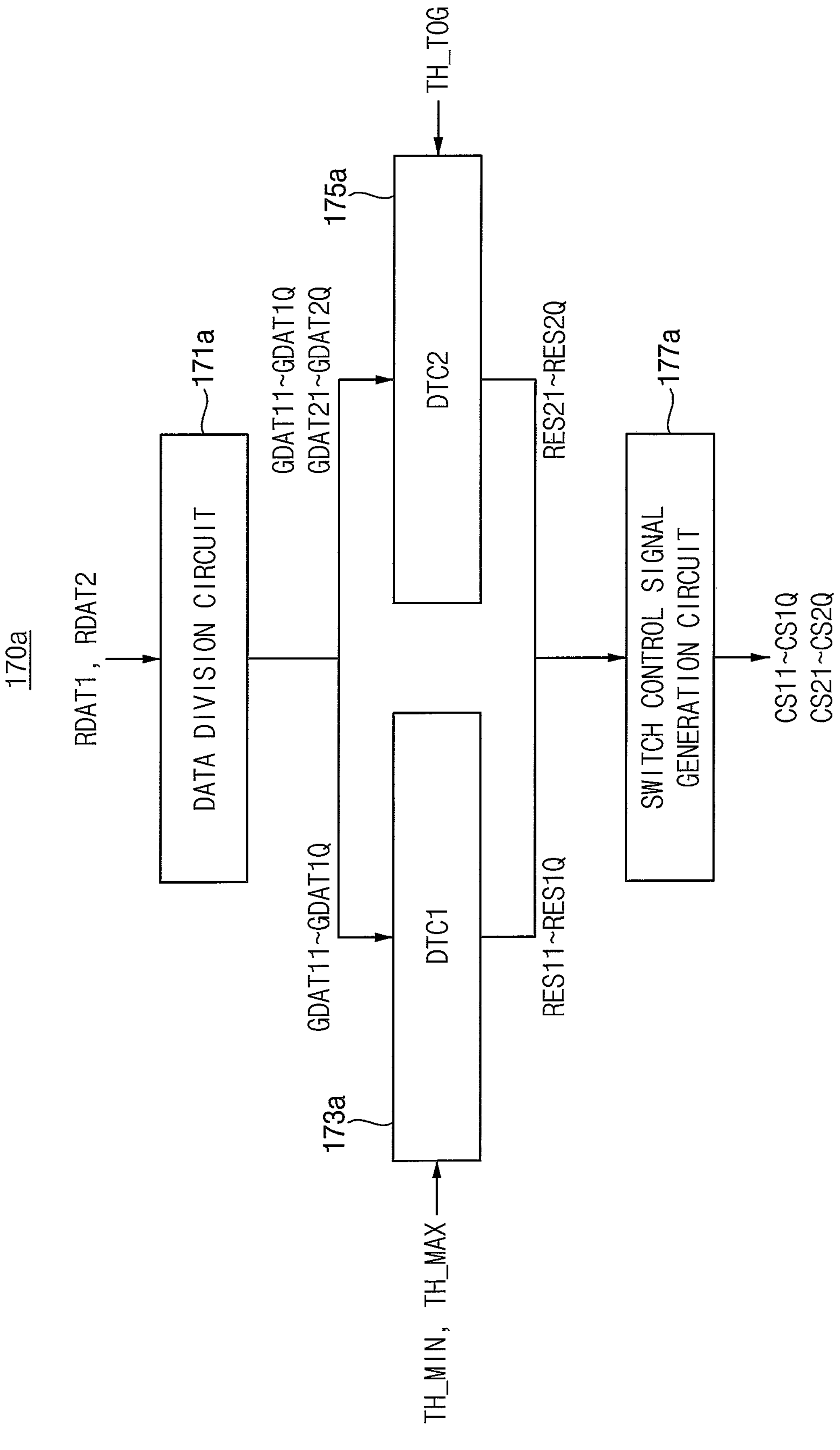
FIGS. 5 and 6 are block diagrams illustrating embodiments of a charge sharing controller included in the display device of FIG. 1.
Figure 6:
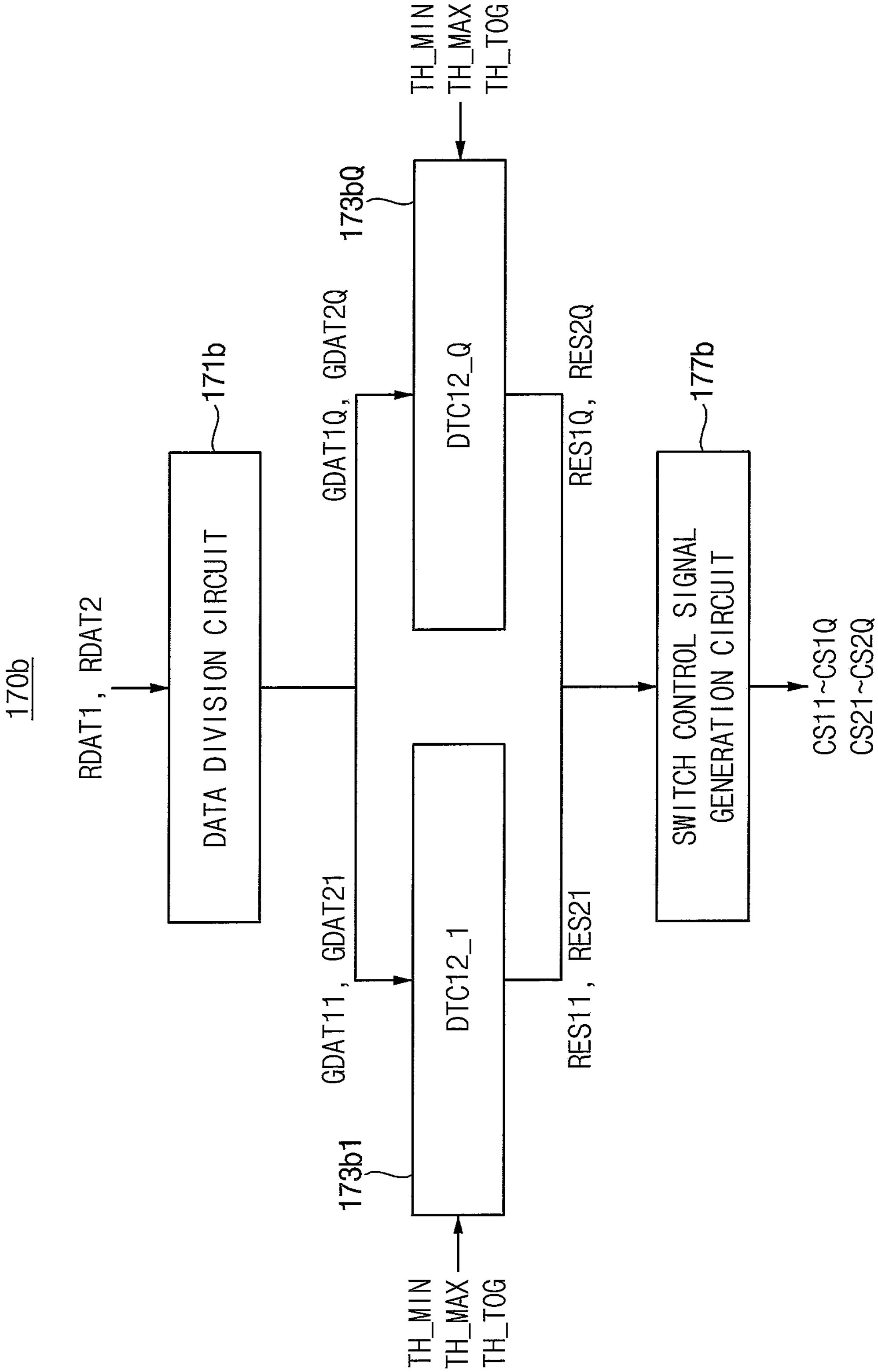

FIGS. 5 and 6 are block diagrams illustrating embodiments of a charge sharing controller included in the display device of FIG. 1.

Referring to FIGS. 1 and 5, a charge sharing controller 170$a$, which corresponds to the charge sharing controller 170 shown in FIG. 1, may include a data division circuit 171$a$, a first determination circuit DTC1 173$a$, a second determination circuit DTC2 175$a$, and a switch control signal generation circuit 177$a$.

The data division circuit 171$a$ may receive the digital data RDAT1 corresponding to pixel values of the $(K-1)^{th}$ row of the display panel, and the digital data RDAT2 corresponding to pixel values of the $K^{th}$ row of the display panel from the data latch circuit 110. The data division circuit 171$a$ may divide the digital data RDAT1 to generate a plurality of $(K-1)^{th}$ digital data groups GDAT11 to GDAT1Q, and divide the digital data RDAT2 to generate a plurality of $K^{th}$ digital data groups.

In some embodiments, the data division circuit 171$a$ may divide the digital data RDAT1 to generate a plurality of $(K-1)^{th}$ digital data groups GDAT11 to GDAT1Q. In this case, the plurality of $(K-1)^{th}$ digital data groups GDAT11 to GDAT1Q may respectively correspond to a plurality of source line groups SLG_1, . . . , SLG_Q. The $(K-1)^{th}$ digital data group GDAT11 may include digital data corresponding to pixel values of a plurality of pixels (e.g., $P_{(K-1)1}$, $P_{(K-1)2}$, $P_{(K-1)3}$, $P_{(K-1)4}$, $P_{(K-1)5}$, $P_{(K-1)6}$, $P_{(K-1)7}$ and $P_{(K-1)8}$), the $(K-1)^{th}$ digital data group GDAT12 may include digital data corresponding to pixel values of a plurality of pixels (e.g., $P_{(K-1)9}$, $P_{(K-1)10}$, $P_{(K-1)11}$, $P_{(K-1)12}$, $P_{(K-1)13}$, $P_{(K-1)14}$, $P_{(K-1)15}$ and $P_{(K-1)16}$), and the $(K-1)^{th}$ digital data group GDAT1Q may include digital data corresponding to pixel values of a plurality of pixels (e.g., $P_{(K-1)(N-7)}$, $P_{(K-1)(N-6)}$, $P_{(K-1)(N-5)}$, $P_{(K-1)(N-4)}$, $P_{(K-1)(N-3)}$, $P_{(K-1)(N-2)}$, $P_{(K-1)(N-1)}$ and $P_{(K-1)N}$).

In some embodiments, the data division circuit 171$a$ may divide the digital data RDAT2 to generate a plurality of $K^{th}$ digital data groups GDAT21 to GDAT2Q. In this case, the plurality of $K^{th}$ digital data groups GDAT21 to GDAT2Q may respectively correspond to the plurality of source line groups SLG_1, . . . , SLG_Q. The $K^{th}$ digital data group GDAT21 may include digital data corresponding to pixel values of a plurality of pixels (e.g., $P_{K1}$, $P_{K2}$, $P_{K3}$, $P_{K4}$, $P_{K5}$, $P_{K6}$, $P_{K7}$ and $P_{K8}$), the $K^{th}$ digital data group GDAT22 may include digital data corresponding to pixel values of a plurality of pixels (e.g., $P_{K9}$, $P_{K10}$, $P_{K11}$, $P_{K12}$, $P_{K13}$, $P_{K14}$, $P_{K15}$ and $P_{K16}$), and the $(K-1)^{th}$ digital data group GDAT2Q may include digital data corresponding to pixel values of a plurality of pixels (e.g., $P_{K(N-7)}$, $P_{K(N-6)}$, $P_{K(N-5)}$, $P_{K(N-4)}$, $P_{K(N-3)}$, $P_{K(N-2)}$, $P_{K(N-1)}$ and $P_{KN}$).

The data division circuit 171$a$ may provide the plurality of $(K-1)^{th}$ digital data groups GDAT11 to GDAT1Q to the first determination circuit 173$a$, and may provide the plurality of $(K-1)^{th}$ digital data groups GDAT11 to GDAT1Q and the plurality of $K^{th}$ digital data groups GDAT21 to GDAT2Q to the second determination circuit 175$a$.

The first determination circuit 173*a* may receive first reference values TH_MIN and TH_MAX from outside, and receive the plurality of $(K-1)^{th}$ digital data groups GDAT11 to GDAT1Q from the data division circuit 171*a*. The second determination circuit 175*a* may receive a second reference value TH_TOG from outside, and receive the plurality of $(K-1)^{th}$ digital data groups GDAT11 to GDAT1Q and the plurality of $K^{th}$ digital data groups GDAT21 to GDAT2Q from the data division circuit 171*a*.

In some embodiments, the first determination circuit 173*a* and the second determination circuit 175*a* may receive the first reference values TH_MIN and TH_MAX and the second reference value TH_TOG from the timing controller described above with reference to FIG. 1.

The first determination circuit 173*a* may determine whether first most significant bits (MSBs) of each of the plurality of $(K-1)^{th}$ digital data groups GDAT11 to GDAT1Q satisfy a first condition, with respect to each of the plurality of source line groups SLG_1, . . . , SLG_Q.

The second determination circuit 175*a* may determine whether the first MSBs of each of the plurality of $(K-1)^{th}$ digital data groups GDAT11 to GDAT1Q and second MSBs of each of the plurality of $K^{th}$ digital data groups GDAT21 to GDAT2Q satisfy a second condition, with respect to each of the plurality of source line groups SLG_1, . . . , SLG_Q.

The plurality of $(K-1)^{th}$ digital data groups GDAT11 to GDAT1Q and the plurality of $K^{th}$ digital data groups GDAT21 to GDAT2Q are data corresponding to pixel values of the $(K-1)^{th}$ row and the $K^{th}$ row of the display panel, and represent grayscales of the pixel values with a plurality of bits, MSBs may be extracted from each of the pixel values.

In some embodiments, the first determination circuit 173*a* may further determine whether the first MSBs of each of the plurality of $(K-1)^{th}$ digital data groups GDAT11 to GDAT1Q satisfy a third condition, with respect to each of the plurality of source line groups SLG_1, . . . , SLG_Q. The second determination circuit 175*a* may further determine whether the first MSBs of each of the plurality of $(K-1)^{th}$ digital data groups GDAT11 to GDAT1Q and second MSBs of each of the plurality of $K^{th}$ digital data groups GDAT21 to GDAT2Q satisfy a fourth condition, with respect to each of the plurality of source line groups SLG_1, . . . , SLG_Q.

In some embodiments, the first determination circuit 173*a* and the second determination circuit 175*a* may determine whether the first condition and the second condition are satisfied for each row unit time interval for driving the display panel row by row.

In some embodiments, when each of the pixel values is represented by a plurality of bits, the first determination circuit 173*a* and the second determination circuit 175*a* may remove from a next-order bit of the MSB to least significant bit (LSB), in the pixel values, to extract the first MSBs and the second MSBs.

The first determination circuit 173*a* may determine that the first condition is satisfied in response to the number of the first MSBs having a first value being included in a first reference range, with respect to each of the plurality of source line groups SLG_1, . . . , SLG_Q, and generate first result data RES11 to RES1Q.

The second determination circuit 175*a* may determine that the second condition is satisfied in response to the number of bit pairs having different values from among bit pairs of the first MSBs and the second MSBs being included in a second reference range, with respect to each of the plurality of source line groups SLG_1, . . . , SLG_Q, and generate second result data RES21 to RES2Q.

Furthermore, it is assumed that the source lines included in each of the plurality of source line groups SLG_Q, . . . , SLG_Q are driven between a maximum driving voltage level and a minimum driving voltage level. In this case, the first determination circuit 173*a* may determine whether the first condition is satisfied, and determine source line groups in which voltage levels of the source lines may be adjusted to be near an intermediate voltage level that is a half of the maximum driving voltage level when the charge sharing is performed. The second determination circuit 175*a* may determine whether the second condition is satisfied, and determine source line groups in which voltage levels of the source lines may change from near the maximum driving voltage level to near the minimum driving voltage level or from near the minimum driving voltage level to near the maximum driving voltage level.

In some embodiments, the first determination circuit 173*a* may determine the first reference range based on the first reference values TH_MIN and TH_MAX, and the second determination circuit 175*a* may determine the second reference range based on the second reference value TH_TOG. The first determination circuit 173*a* may provide the first result data RES11 to RES1Q to the switch control signal generation circuit 177*a*, and the second determination circuit 175*a* may provide the second result data RES21 to RES2Q to the switch control signal generation circuit 177*a*. Operations of the first determination circuit 173*a* and the second determination circuit 175*a* will be described later with reference to FIGS. 8 and 9.

The switch control signal generation circuit 177*a* may activate each of the plurality of group switch control signals CS11 to CS1Q to turn on the plurality of first switches described above with reference to FIG. 2 in response to the first MSBs satisfying the first condition and the first MSBs and the second MSBs satisfying the second condition, with respect to each of the plurality of source line groups SLG_1, . . . , SLG_Q, based on the first result data RES11 to RES1Q and the second result data RES21 to RES2Q.

The switch control signal generation circuit 177*a* may deactivate each of the plurality of group switch control signals CS11 to CS1Q to turn off the plurality of first switches in response to the first MSBs not satisfying the first condition, or the first MSBs and the second MSBs not satisfying the second condition, with respect to each of the plurality of source line groups SLG_1, . . . , SLG_Q, based on the first result data RES11 to RES1Q and the second result data RES21 to RES2Q.

As described above with reference to FIG. 1, the driving switch circuit 130 includes a plurality of switch circuits (e.g., the first switch circuit 131 to the $Q^{th}$ switch circuit 13Q), each of the plurality of switch circuits includes a plurality of first switches, and thus the driving switch circuit 133 may electrically connect source lines included in each of the plurality of the source line groups SLG_1, . . . , SLG_Q to one another to perform the charge sharing, based on the plurality of group switch control signals CS11 to CS1Q.

The switch control signal generation circuit 177*a* may generate the group switch control signals CS21 to CS2Q so that the charge sharing is performed in an appropriate interval in relation to an original function of the display device 100 for displaying an image on the display panel. A relationship between the plurality of group switch control signals CS11 to CS1Q and the plurality of group switch control signals CS21 to CS2Q will be described later with reference to FIG. 10.

Referring to FIGS. 1 and 6, a charge sharing controller 170*b*, which corresponds to the charge sharing controller 170 shown in FIG. 1, may include a data division circuit 171*b*, a plurality of determination circuits DTC12_1 173*b*1 to DTC12_Q 173*b*Q, and a switch control signal generation circuit 177*b*. In FIGS. 5 and 6, the data division circuit 171*a* corresponds to the data division circuit 171*b*, the first and second determination circuits 173*a* and 175*a* correspond to the plurality of determination circuits DTC12_1 173*b*1 to DTC12_Q 173*b*Q, and the switch control signal generation circuit 177*a* corresponds to the switch control signal generation circuit 177*ab*, in terms of their respective functions. However, in FIG. 6, the charge sharing controller 170*b* may include 'Q' number of determination circuits 173*b*1 to 173*b*Q.

Each of the decision circuits 173*b*1 to 173*b*Q may receive the first reference values TH_MIN and TH_MAX and the second reference value TH_TOG. The first determination circuit 173*b*1 may receive the $(K-1)^{th}$ digital data group GDAT11 and the $K^{th}$ digital data group GDAT21 to generate the first result data RES11 and the second result data RES21, provide the first result data RES11 and the second result data RES21 to the switch control signal generation circuit 177*b*, and the $Q^{th}$ determination circuit 173*b*Q may receive the $(K-1)^{th}$ digital data group GDAT1Q and the $K^{th}$ digital data group GDAT2Q to generate the first result data RES1Q and the second result data RES2Q, and provide the first result data RES1Q and the second result data RES2Q to the switch control signal generation circuit 177*b*.

The switch control signal generation circuit 177*b* may receive the first result data RES11 to RES1Q and the second result data RES21 to RES2Q from the first to $Q^{th}$ determination circuits 173*b*1 to 173*b*Q to generate a plurality of group switch control signals CS11 to CS1Q and CS21 to CS2Q.

Figure 7:
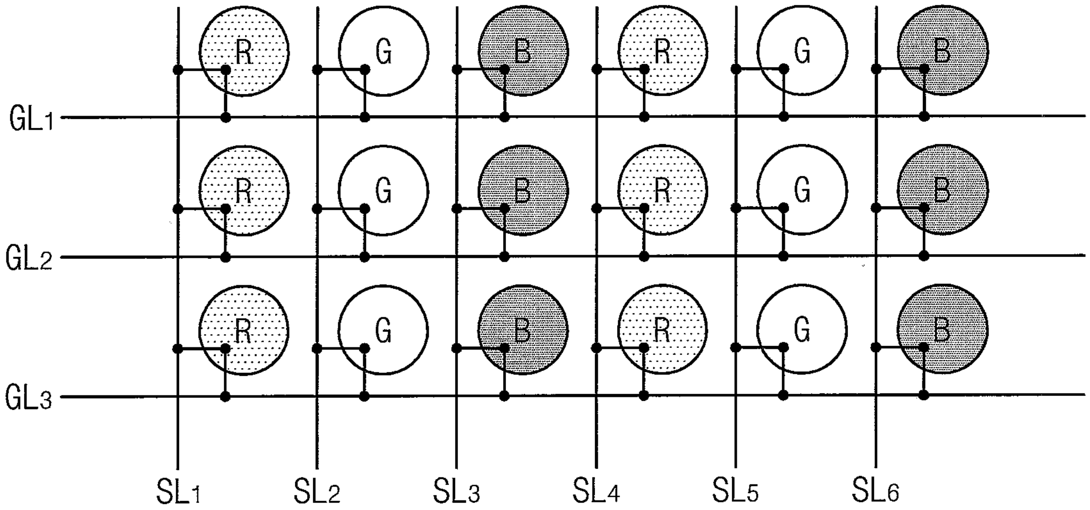
FIG. 7 is a diagram illustrating an arrangement structure of a plurality of pixels included in the display panel of FIG. 1, according to an embodiment.

FIG. 7 is a diagram illustrating an arrangement structure of a plurality of pixels included in the display panel of FIG. 1, according to an embodiment.

Referring to FIG. 7, a display panel may include a plurality of pixels which are connected to a plurality of gate lines $GL_1$, $GL_2$ and $GL_3$ and a plurality of source lines $SL_1$, $SL_2$, $SL_3$, . . . , $SL_6$, and are arranged in a plurality of rows and a plurality of columns. The plurality of pixels may include red pixels R, green pixels G and blue pixels B.

In some embodiments, the plurality of gate lines $GL_1$, $GL_2$ and $GL_3$ may extend in a first direction, and the plurality of source lines $SL_1$, $SL_2$, $SL_3$, . . . , $SL_6$ may extend in a second direction crossing the first direction.

In some embodiments, the red pixels R and the blue pixels B may be arranged in odd-numbered columns, and the green pixels G may be arranged in even-numbered columns. For example, in each of the plurality of rows, the plurality of pixels may have a structure in which the red pixels R, the green pixels G and the blue pixels B are alternately arranged one by one. Such an arrangement structure may be referred to as an RGB stripe structure.

Figure 8:
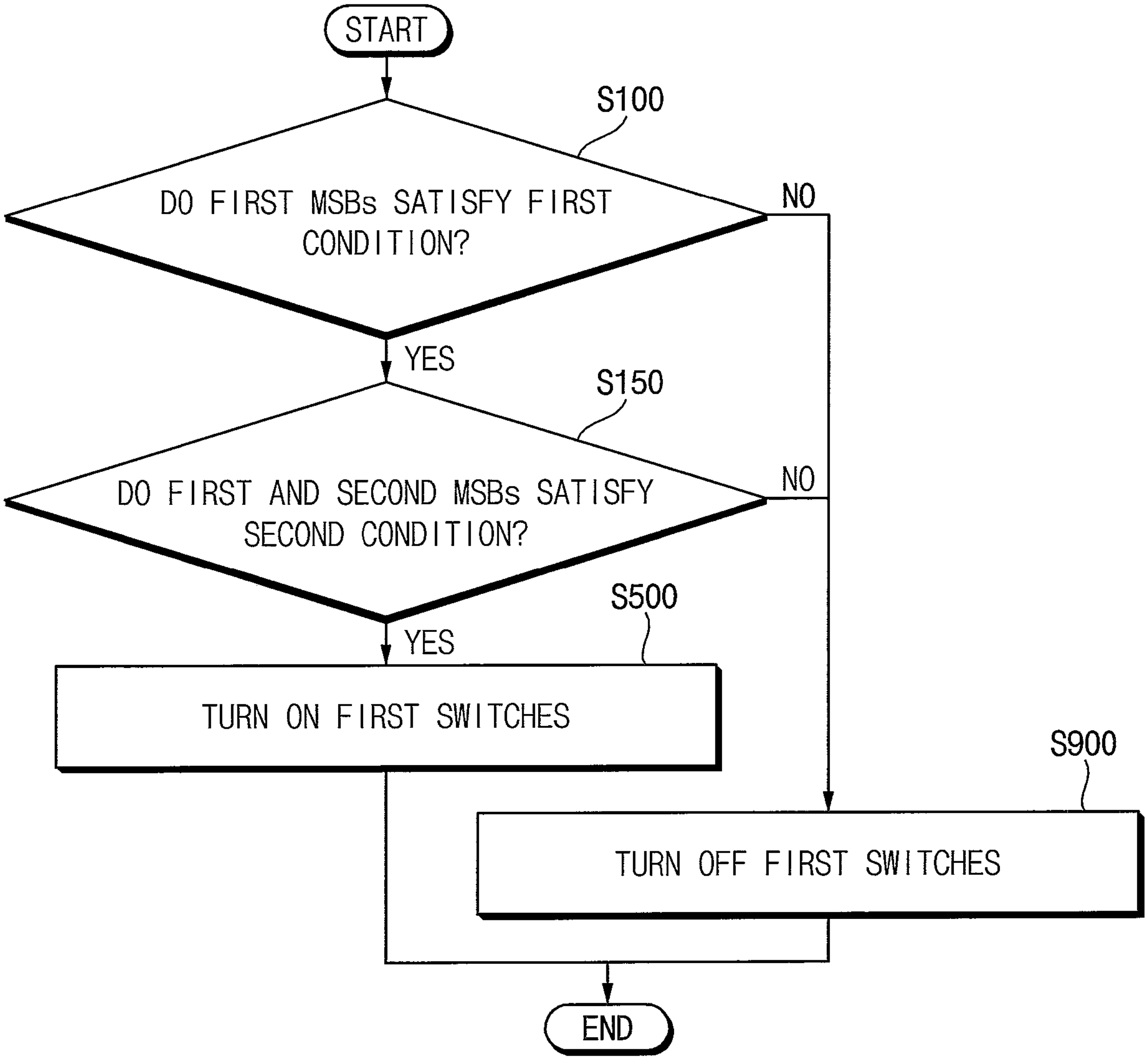
FIG. 8 is a flowchart illustrating an embodiment of an operation of a charge sharing controller included in the display device of FIG. 1.
Figure 9:
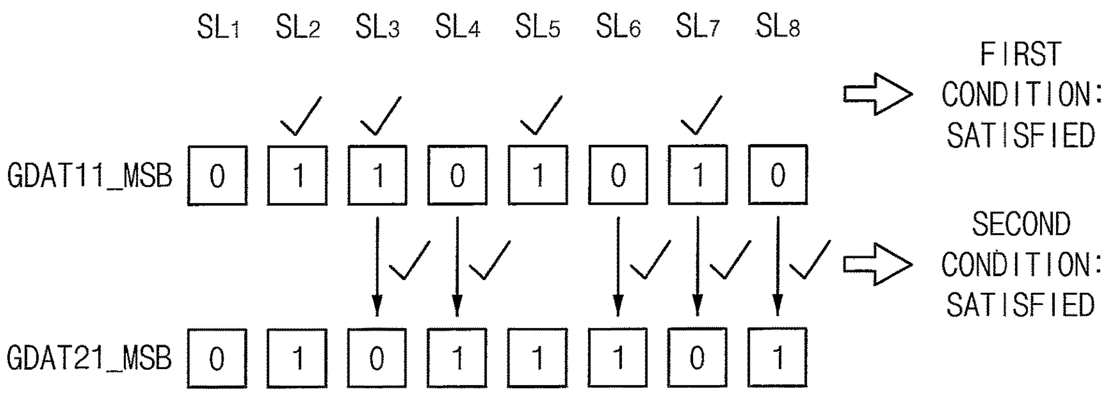
FIG. 9 is a diagram for describing a process in which a charge sharing controller included in the display device of FIG. 1 determines first and second conditions.

FIG. 8 is a flowchart illustrating an embodiment of an operation of a charge sharing controller included in the display device of FIG. 1. FIG. 9 is a diagram for describing a process in which a charge sharing controller included in the display device of FIG. 1 determines first and second conditions.

Referring to FIGS. 1, 5, 6 and 8, the charge sharing controller 170 may turn on the plurality of first switches described above with reference to FIG. 2 (S500) in response to the first MSBs satisfying the first condition (S100: YES) and the first MSBs and the second MSBs satisfying the second condition (S150: YES) based on the first result data RES11 to RES1Q and the second result data RES21 to RES2Q, with respect to each of the plurality of source line groups SLG_1, . . . , SLG_Q.

The charge sharing controller 170 may turn off the plurality of first switches in response to the first MSBs not satisfying the first condition (S100: NO) or the first MSBs and the second MSBs not satisfying the second condition (S150: NO) based on the first result data RES11 to RES1Q and the second result data RES21 to RES2Q, with respect to each of the plurality of source line groups SLG_1, . . . , SLG_Q.

In some embodiments, whether the first condition is satisfied may be determined by the first determination circuits 173*a* and the determination circuits 173*b*1 to 173*b*Q described above with reference to FIGS. 5 and 6. Whether the second condition is satisfied may be determined by the second determination circuits 175*a* and the determination circuits 173*b*1 to 173*b*Q described above with reference to FIGS. 5 and 6.

In FIG. 9, a first source line group SLG_1 among a plurality of source line groups SLG_1, . . . , SLG_Q may include first to eighth source lines $SL_1$ to $SL_8$. For convenience of description, first MSBs GDAT11_MSB and second MSBs GDAT21_MSB extracted from the plurality of $(K-1)^{th}$ digital data groups and the plurality of $K^{th}$ digital data groups corresponding to the first source line group SLG_1 are illustrated. However, first MSBs GDAT12_MSB, . . . , GDAT1Q_MSB and second MSBs GDAT22_MSB, . . . , GDAT2Q_MSB may be extracted, with respect to the remaining source line groups SLG_2, . . . , SLG_Q in the same manner as the first source line group SLG_1. Hereinafter, it is assumed that values of the first MSBs GDAT11_MSB and the second MSBs GDAT21_MSB are '01101010' and '01011101', respectively.

In some embodiments, the first MSBs GDAT11_MSB may be extracted from digital data corresponding to pixel value of each of a plurality of pixels (e.g., $P_{(K-1)1}$, $P_{(K-1)2}$, $P_{(K-1)3}$, $P_{(K-1)4}$, $P_{(K-1)5}$, $P_{(K-1)6}$, $P_{(K-1)7}$, and $P_{(K-1)8}$), and the second MSBs GDAT21_MSB may be extracted from digital data corresponding to pixel value of each of a plurality of pixels (e.g., $P_{K1}$, $P_{K2}$, $P_{K3}$, $P_{K4}$, $P_{K5}$, $P_{K6}$, $P_{K7}$, and $P_{K8}$).

The charge sharing controller 170 may determine that the first condition is satisfied in response to the number of the first MSBs having a first value is included in a first reference range. In this case, the first value may be one of '1' and '0', and the first reference range may be determined based on a number corresponding to a half of the number of the first MSBs GDAT11_MSB (or source lines included in each source line group) and a predetermined margin. For example, the first value may be '1', and the first reference range may be determined as a range (e.g., a range greater than or equal to '3' and less than or equal to '5') having a margin of '±1' based on a number (e.g., '4') corresponding to a half of the number of the first MSBs GDAT11_MSB.

The charge sharing controller 170 may determine that the second condition is satisfied in response to the number of bit pairs having different values from among bit pairs of the first MSBs GDAT11_MSB and the second MSBs GDAT21_MSB is included in a second reference range. In this case, the bit pairs may be generated based on bits positioned at the same digit in each of the first MSBs GDAT11_MSB and the second MSBs GDAT21_MSB. For example, in the in FIG. 9, the bit pairs may be (0,0), (1,1), (1,0), (0,1), (1,1), (0,1), (1,0) and (0,1), and the second reference range may be determined to be a range greater than or equal to a half (e.g., '4') of the number of the first MSBs GDAT11_MSB.

Accordingly, in the in FIG. 9, the number of first MSBs GDAT11_MSB having the first value is '4' and is included in the first reference range, and thus, the first condition is satisfied. The number of bit pairs having different values from among bit pairs of the first MSBs GDAT11_MSB and the second MSBs GDAT21_MSB is '4' and is included in the second reference range, and thus, the second condition is satisfied. In this case, since the first condition and the second condition are satisfied, the charge sharing controller 170 may turn on the plurality of first switches. As a result, the charge sharing may be performed by electrically connecting the source lines $SL_1$ to $SL_8$ included in the first source line group SLG_1 to one another.

Figure 10:
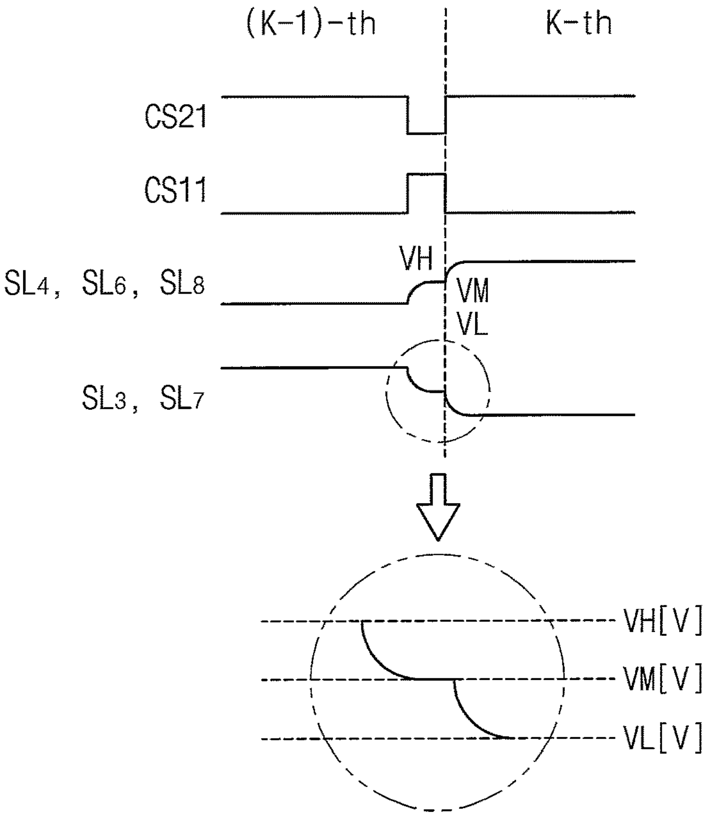
FIG. 10 is a timing diagram illustrating changes in voltage levels in group switch control signals and source lines in the display device of FIG. 1, according to an embodiment.
Figures 11, 12:
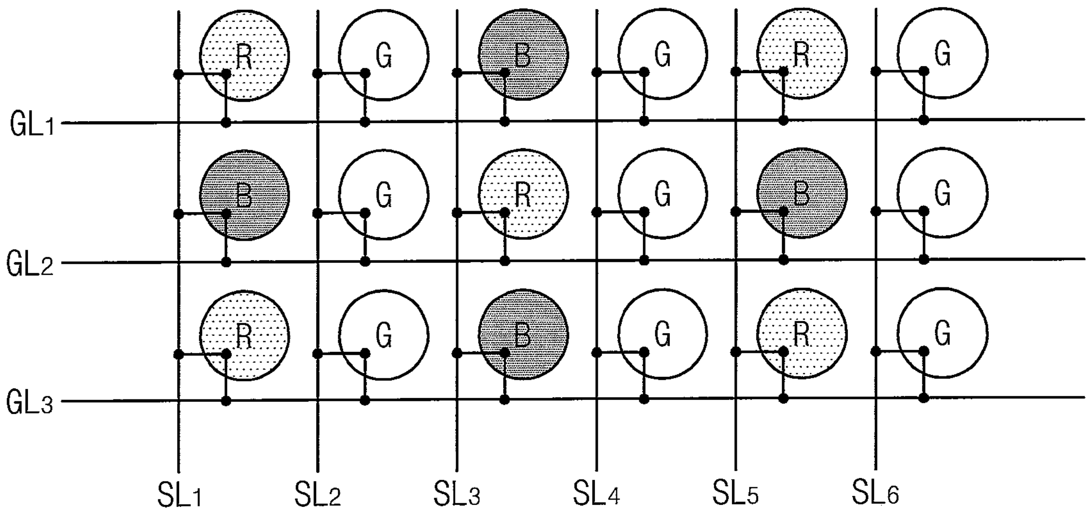
FIG. 11 is a diagram for describing a change in consumption current according to whether charge sharing is performed in the display device of FIG. 1, according to an embodiment.
FIG. 12 is a diagram illustrating an arrangement structure of a plurality of pixels included in the display panel of FIG. 1, according to an embodiment.

FIG. 10 is a timing diagram illustrating changes in voltage levels in group switch control signals and source lines in the display device of FIG. 1, according to an embodiment. FIG. 11 is a diagram for describing a change in consumption current according to whether charge sharing is performed in the display device of FIG. 1.

In FIG. 10, when charge sharing is performed before and after a $K^{th}$ row of a display panel is driven after a $(K-1)^{th}$ row of the display panel is driven, changes in voltage levels of group switch control signals CS11 and CS21 and source lines $SL_3$, $SL_4$, $SL_6$, $SL_7$, and $SL_8$ are illustrated. Each of the time interval in which the $(K-1)^{th}$ row is driven and the time interval in which the $K^{th}$ row is driven may be referred to as a 'row unit time interval' described above with reference to FIG. 1.

Referring to FIG. 10, in the interval in which the $(K-1)^{th}$ row of the display panel is driven, a voltage level of the group switch control signal CS21 may be maintained at a logic high level while performing an original function of the display device for displaying an image on the display panel. In this case, the plurality of second switches described above with reference to FIG. 1 may be turned on.

After displaying the image on the display panel, the voltage level of the group switch control signal CS21 may be changed from the logic high level to a logic low level. When the plurality of first switches are turned on as described above with reference to FIG. 8, while the voltage level of the group switch control signal CS21 is maintained at the logic low level, the voltage level of the group switch control signals CS11 may be maintained at a logic high level to perform the charge sharing.

In the in FIG. 9, when the charge sharing is performed, the source lines $SL_1$ to $SL_8$ included in the first source line group SLG_1 are electrically connected to each other, and thus the voltage level of each of the source lines may be adjusted to be near the intermediate voltage level VM, which is a half of the maximum driving voltage level.

For example, the source lines $SL_4$, $SL_6$ and $SL_8$ may be adjusted from near the minimum driving voltage level VL before the charge sharing is performed to near the intermediated voltage level VM while the charge sharing is performed, and may be adjusted to near the maximum driving voltage level VH after the charge sharing is performed. The source lines $SL_3$ and SL 7 may be adjusted from near the maximum driving voltage level VH before the charge sharing is performed to near the intermediated voltage level VM while the charge sharing is performed, and may be adjusted to near the minimum driving voltage level VL after the charge sharing is performed.

Referring to FIGS. 10 and 11, in the in FIG. 9, when the charge sharing is not performed, consumption current of the display panel may correspond to 22.9 mA. When the charge sharing is performed, the consumption current of the display panel may correspond to 19.5 mA. Accordingly, the consumption current may be reduced by about 15% by performing the charge sharing.

FIG. 12 is a diagram illustrating an arrangement structure of a plurality of pixels included in the display panel of FIG. 1, according to an embodiment.

Referring to FIG. 12, a display panel may include a plurality of pixels which are connected to a plurality of gate lines $GL_1$, $GL_2$ and $GL_3$ and a plurality of source lines $SL_1$, $SL_2$, $SL_3$, . . . , $SL_6$, and are arranged in a plurality of rows and a plurality of columns. The plurality of pixels may include red pixels R, green pixels G and blue pixels B.

In some embodiments, the plurality of gate lines $GL_1$, $GL_2$ and $GL_3$ may extend in a first direction, and the plurality of source lines $SL_1$, $SL_2$, $SL_3$, . . . , $SL_6$ may extend in a second direction crossing the first direction.

In some embodiments, the red pixels R and the blue pixels B may be arranged in odd-numbered columns, and the green pixels G may be arranged in even-numbered columns. For example, in each of the plurality of rows, the plurality of pixels may have a structure in which the read-green pixel pairs and blue-green pixel pairs are alternately arranged. Such an arrangement structure may be referred to as a pentile structure.

In the pentile structure of FIG. 12, since only identical green pixels are arranged in even-numbered columns, a need for the charge sharing is likely to be small. However, since different read pixels and blue pixels are alternately arranged in odd-numbered columns, the need for the charge sharing is highly likely. Accordingly, as will be described later, the charge sharing may be performed for odd-numbered source lines using a third condition and a fourth condition.

Figure 13:
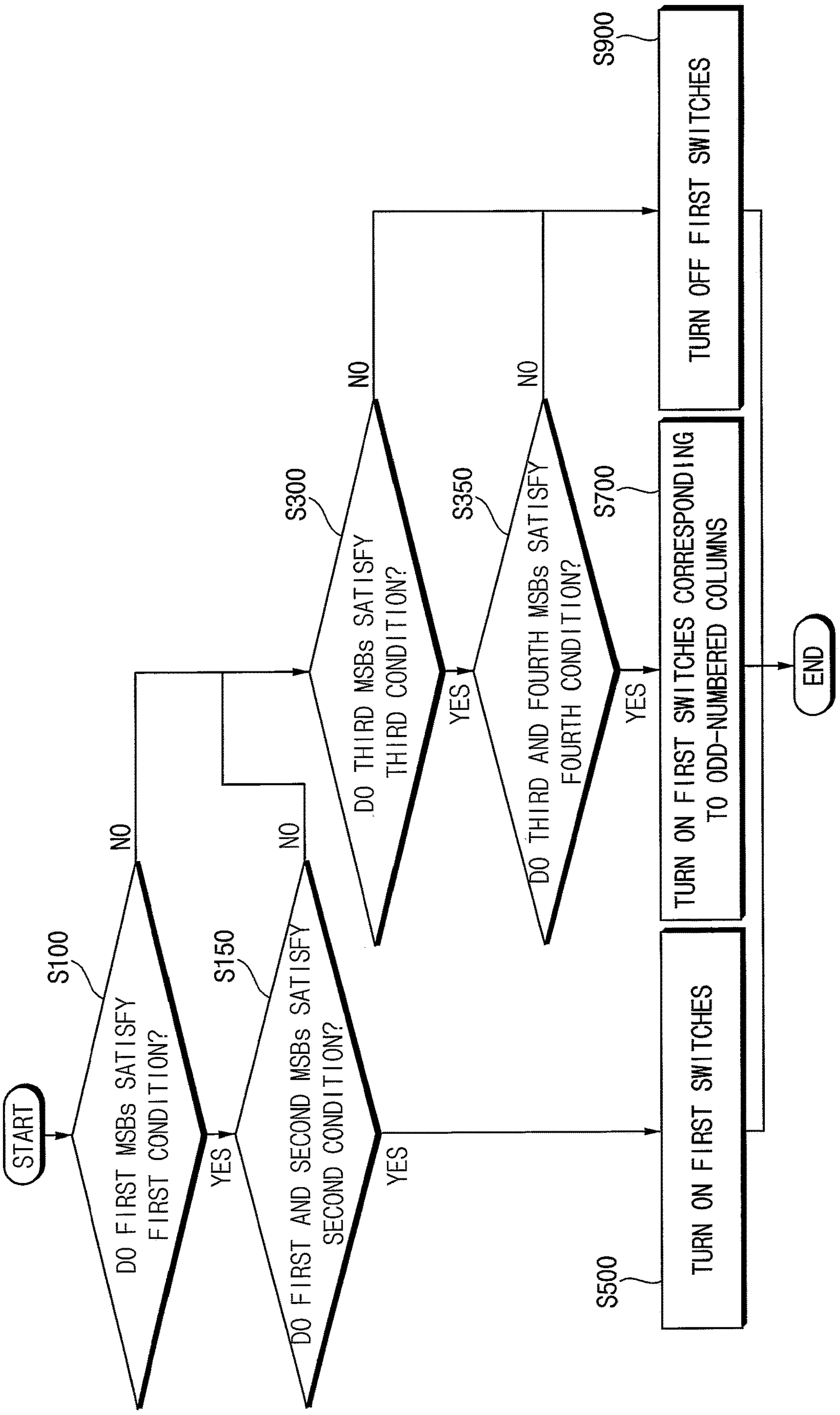
FIG. 13 is a flowchart illustrating an embodiment of an operation of a charge sharing controller included in the display device of FIG. 1.

FIG. 13 is a flowchart illustrating an embodiment of an operation of a charge sharing controller included in the display device of FIG. 1.

In FIG. 13, charge sharing may be performed with respect to the display panel having the pentile structure described above with reference to FIG. 12.

Referring to FIGS. 1, 5, 6, 12 and 13, the charge sharing controller 170 may turn on the plurality of first switches described above with reference to FIG. 2 (S500) in response to the first MSBs satisfying the first condition (S100: YES) and the first MSBs and the second MSBs satisfying the second condition (S150: YES) based on the first result data RES11 to RES1Q and the second result data RES21 to RES2Q, with respect to each of the plurality of source line groups SLG_1, . . . , SLG_Q.

The charge sharing controller 170 may turn on the plurality of first switches corresponding to the odd-numbered columns (S700) in response to the first MSBs not satisfying the first condition (S100: NO) or the first MSBs and the second MSBs not satisfying the second condition (S150: NO) and in response to third MSBs satisfying the third condition (S300: YES) and the third MSBs and fourth MSBs satisfying fourth condition (S350: YES) based on the first result data RES11 to RES1Q and the second result data RES21 to RES2Q, with respect to each of the plurality of source line groups SLG_1, . . . , SLG_Q.

In some embodiments, the third MSBs may be bits correspond to selected columns, such as odd-numbered columns, of the display panel among the first MSBs, and the fourth MSBs may be bits correspond to the selected columns, such as the odd-numbered columns, of the display panel among the second MSBs. In the embodiments herein, the selected columns are the odd-numbered columns of the display panel. However, the selected columns may not be limited to the odd-numbered columns, according to embodiments.

The charge sharing controller 170 may turn off the plurality of first switches in response to the third MSBs not satisfying the third condition (S300: NO) or the third MSBs and the fourth MSBs not satisfying the fourth condition (S350: NO) based on the first result data RES11 to RES1Q and the second result data RES21 to RES2Q, with respect to each of the plurality of source line groups SLG_1, . . . , SLG_Q.

In some embodiments, whether the first condition is satisfied or the third condition is satisfied may be determined by the first determination circuit 173*a* and the determination circuits 173*b*1 to 173*b*Q described above with reference to FIGS. 5 and 6. Whether the second condition is satisfied or the fourth condition is satisfied may be determined by the second determination circuit 175*a* and the determination circuits 173*b*1 to 173*b*Q described above with reference to FIGS. 5 and 6.

Figure 14A:
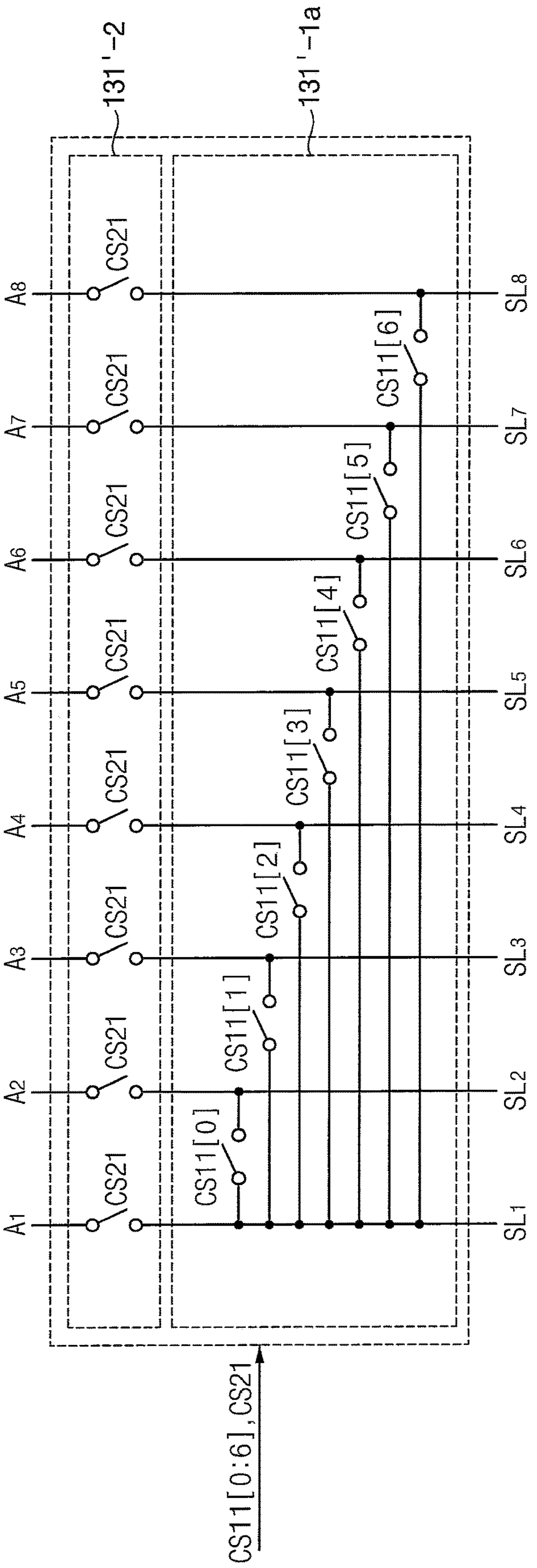
FIGS. 14A and 14B are block diagrams illustrating embodiments of a first switch circuit included in the display device of FIG. 1.
Figure 14B:
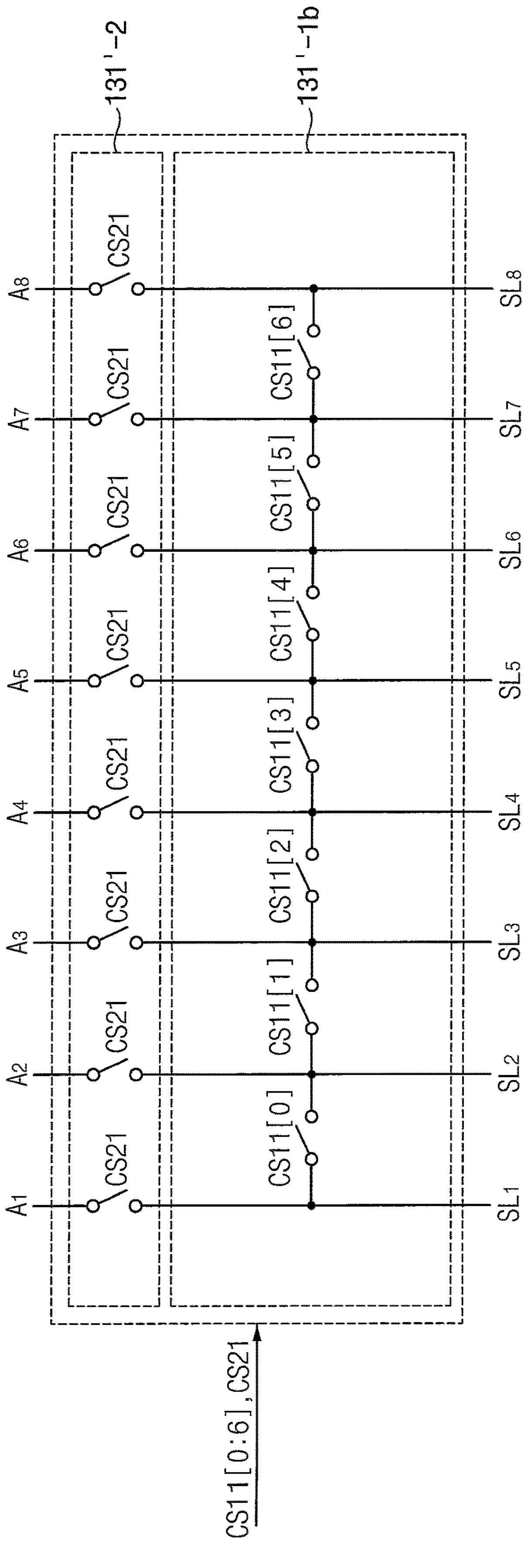

FIGS. 14A and 14B are block diagrams illustrating embodiments of a first switch circuit included in the display device of FIG. 1.

In FIGS. 14A and 14B, first switch circuits 131'*a* and 131'*b*, each of which corresponds to the first switch circuit 131 shown in FIG. 1, performing the S700 operation are illustrated. In FIGS. 2A, 2B, 14A and 14B, components having similar reference numerals perform similar functions (e.g., 131-1*a* and 131'-1*a*, 131-2*a* and 131'-2*a*).

Referring to FIGS. 2A and 14A, the first switch circuit 131'*a* may receive analog data $A_1, A_2, A_3, \ldots, A_8$ converted from digital data $D_1, D_2, D_3, \ldots, D_8$ and provide the analog data $A_1, A_2, A_3, \ldots, A_8$ to first to eighth source lines $SL_1$ to $SL_8$ included in first source line group SLG_1, respectively.

The first switch circuit 131'*a* may include a plurality of first switches 131'-1*a* and a plurality of second switches 131'-2.

The plurality of first switches 131'-1*a* may connect first to eight source lines $SL_1$ to $SL_8$ included in the first source line group SLG_1 to one another. In some embodiments, the plurality of first switches 131'-1*a* may connect a reference source line (e.g., $SL_1$), which is one source line of the source lines included in the first source line group SLG_1, respectively to the other source lines $SL_2$ to $SL_8$ included in the first source line group SLG_1. In FIG. 14A, the first source line $SL_1$ is illustrated as corresponding to the reference source line, however, embodiments are not limited thereto. The plurality of second switches 131'-2 may connect first to eight source lines $SL_1$ to $SL_8$ included in the first source line group SLG_1 to the digital-to-analog converter 120 in FIG. 1.

The first switch 131'*a* may receive group switch control signals CS11 and CS21 from the charge sharing controller 170 in FIG. 1.

In some embodiments, the plurality of first switches 131'-1*a* may be turned on or off based on the group switch control signal CS11, and the plurality of second switches 131'-2 may be turned on or off based on the group switch control signal CS21.

In some embodiments, the group switch control signals CS11[0:6] may be 7-bit signals and CS21 may be 1-bit signals, and in embodiments in FIG. 14A, the plurality of first switches 131'-1*a* may be turned on at once according to the S500 operation described above with reference to FIG. 13. In this case, the group switch control signals CS11[0:6] may have values of '1111111'. Only the plurality of first switches 131'-1*a* corresponding to odd-numbered columns of the display panel may be turned on or off at once according to the S700 operation described above with reference to FIG. 13. In this case, the group switch control signals CS11[0:6] may have values of '1010101'. The plurality of first switches 131'-1*a* may be turned off at once according to the S900 operation described above with reference to FIG. 13. In this case, the group switch control signals CS11[0:6] may have values of '0000000'. The plurality of second switches 131'-2 may also be turned on or off at once. However, time points at which the plurality of first switches 131'-1*a* and the plurality of second switches 131'-2 are turned on may be different from each other.

In FIG. 14A, the first switch circuit 131'*a* is illustrated as an embodiment of the plurality of switch circuits included in the driving switch circuit 133, however, the plurality of switch circuits other than the first switch circuit 131'*a* may also have the same configuration as the first switch circuit 131'*a*.

In some embodiments, the plurality of first switches included in each of the plurality of first switch circuits may connect a reference source line, which is one source line of the source lines included in each of the plurality of source line groups SLG_1, . . . , SLG_Q, respectively to the other source lines included in each of the plurality of source line groups SLG_1, . . . , SLG_Q. However, embodiments are not limited thereto. In some embodiments, as illustrated in FIG. 14B, first switch circuit 131'*b* may include a plurality of first switches 131'-1*b* and a plurality of second switches 131'-2, and each of the plurality of first switches 131'-1*b* may respectively connect two adjacent source lines among the source lines included in each of the plurality of source line groups SLG_1, . . . , SLG_Q to each other.

Figure 15:
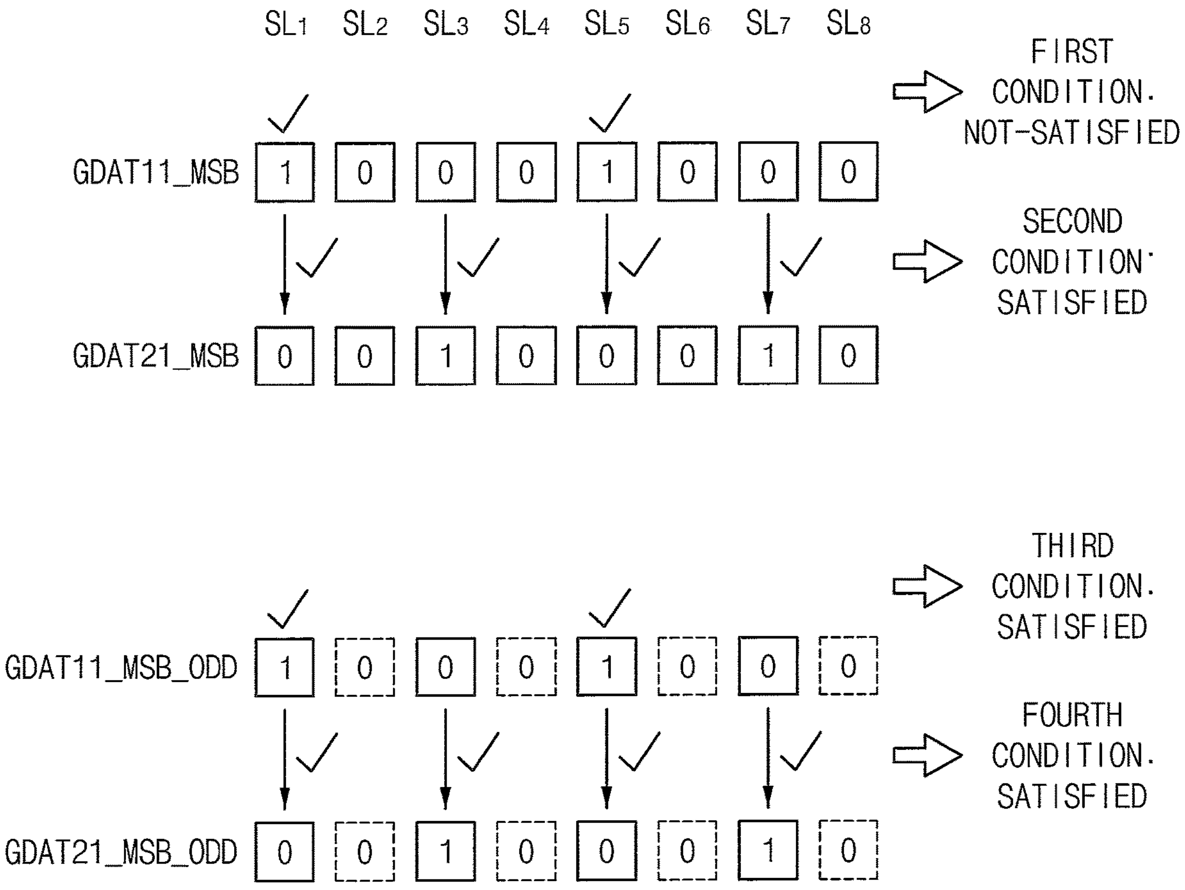
FIG. 15 is a diagram for describing a process in which a charge sharing controller included in the display device of FIG. 1 determines first to fourth conditions, according to an embodiment.

FIG. 15 is a diagram for describing a process in which a charge sharing controller included in the display device of FIG. 1 determines first to fourth conditions, according to an embodiment.

Referring to FIGS. 1, 5, 6, 8, 13, 14A, 14B and 15, the charge sharing controller 170 may generate each of the plurality of group switch controls based on the first MSBs, the second MSBs, the third MSBs and the fourth MSBs.

In some embodiments, the charge sharing controller 170 may determine the first to fourth conditions using components similar to those illustrated in FIGS. 5 and 6. The charge sharing controller 170 may determine that the first condition is satisfied in response to the number of the first MSBs having a first value is included in a first reference range. In this case, the first value may be one of '1' and '0', and the first reference range may be determined based on a number corresponding to a half of the number of the first MSBs GDAT11_MSB (or source lines included in each source line group) and a predetermined margin. For example, the first value may be '1', and the first reference range may be determined as a range (e.g., a range greater than or equal to '3' and less than or equal to '5') having a margin of '±1' based on a number (e.g., '4') corresponding to a half of the number of the first MSBs GDAT11_MSB.

The charge sharing controller 170 may determine that the second condition is satisfied in response to the number of bit pairs having different values from among bit pairs of the first MSBs GDAT11_MSB and the second MSBs GDAT21_MSB is included in a second reference range. In this case, the bit pairs may be generated based on bits positioned at the same digit in each of the first MSBs GDAT11_MSB and the second MSBs GDAT21_MSB. For example, in the in FIG. 15, the bit pairs may be (1,0), (0,0), (0,1), (0,0), (1,0), (0,0), (0,1) and (0,0), and the second reference range may be determined to be a range greater than or equal to a half (e.g., '4') of the number of the first MSBs GDAT11_MSB.

Accordingly, in the in FIG. 15, the number of first MSBs GDAT11_MSB having the first value is '2' and is out of the first reference range, and thus, the first condition is not satisfied. The number of bit pairs having different values from among bit pairs of the first MSBs GDAT11_MSB and the second MSBs GDAT21_MSB is '4' and is included in the second reference range, and thus the second condition is satisfied. In this case, since the second condition is satisfied but the first condition is not satisfied, the charge sharing controller 170 may determine that the third condition is satisfied in response to the number of the third MSBs GDAT11_MSB ODD having the first value is included in a third reference range. For example, the first value may be one of '1' and '0', and the third reference range may be determined based on a number corresponding to a half of the number of the third MSBs GDAT11_MSB ODD and a predetermined margin. For example, the first value may be '1', and the third reference range may be determined as a range (e.g., a range greater than or equal to '1' and less than or equal to '3') having a margin of '±l' based on a number (e.g., '2') corresponding to a half of the number of the third MSBs GDAT11_MSB ODD.

The charge sharing controller 170 may determine that the fourth condition is satisfied in response to the number of bit pairs having different values from among bit pairs of the third MSBs GDAT11_MSB ODD and the fourth MSBs GDAT21_MSB ODD is included in a fourth reference range. In this case, the bit pairs may be generated based on bits positioned at the same digit in each of the third MSBs GDAT11_MSB ODD and the fourth MSBs GDAT21_MSB ODD. For example, in the in FIG. 15, the bit pairs may be (1,0), (0,1), (1,0) and (0,1), and the fourth reference range may be determined to be a range greater than or equal to half (e.g., '2') the number of the third MSBs GDAT11_MSB ODD.

Accordingly, in the in FIG. 15, the number of third MSBs GDAT11_MSB ODD having the first value is '2' and is included in the third reference range, and thus, the third condition is satisfied. The number of bit pairs having different values from among bit pairs of the third MSBs GDAT11_MSB ODD and the fourth MSBs GDAT21_MSB ODD is '4' and is included in the fourth reference range, and thus, the fourth condition is satisfied. In this case, since the third condition and the fourth condition are satisfied, the charge sharing controller 170 may turn on the plurality of first switches corresponding to odd-numbered columns. As a result the charge sharing may be performed by electrically connecting odd-numbered source lines $SL_1$, $SL_3$, SL 5 and SL 7 included in the first source line group SLG_1 to one another.

Figure 16:
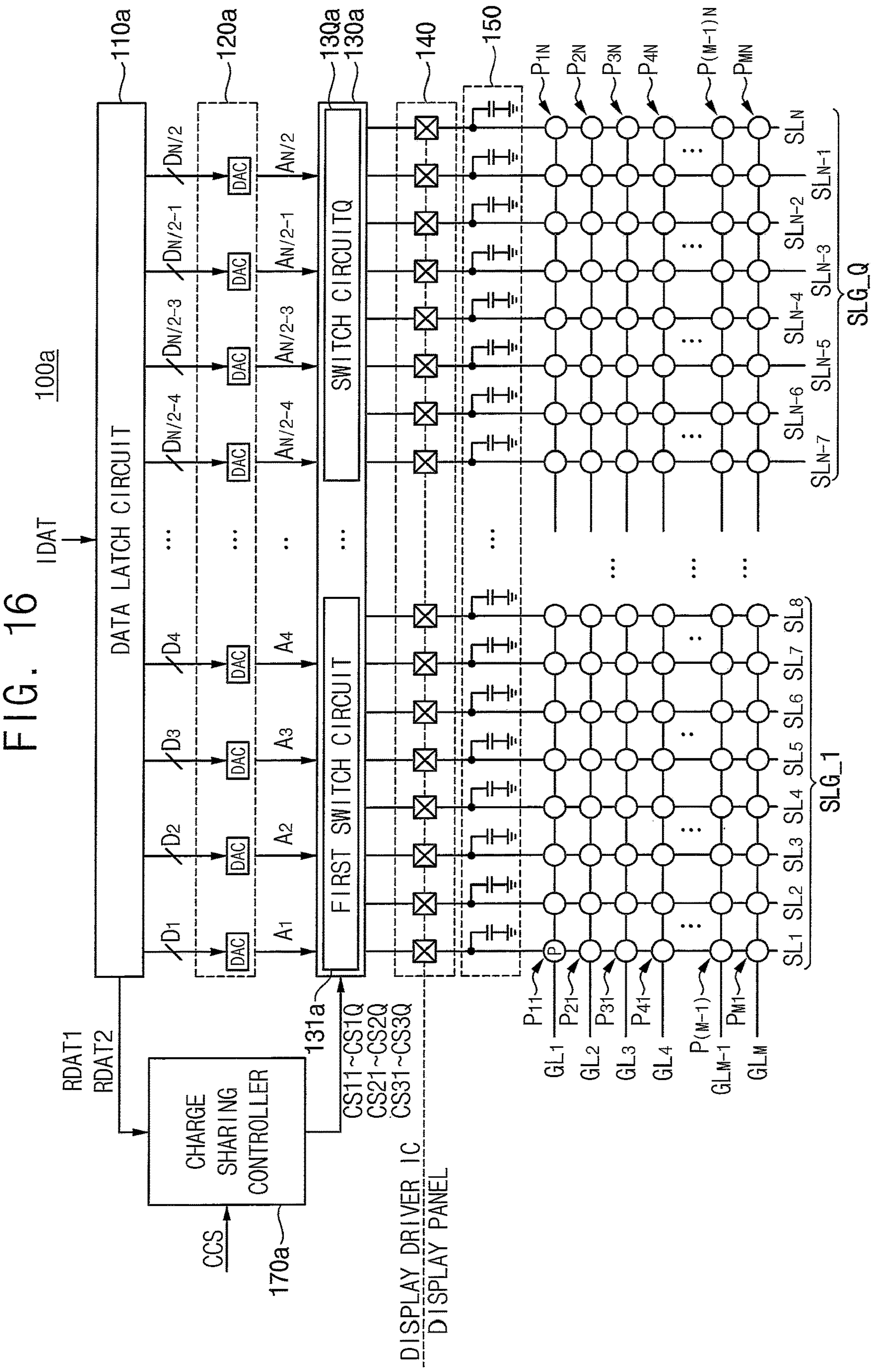
FIG. 16 is a block diagram illustrating a display device, according to embodiments.
Figure 17:
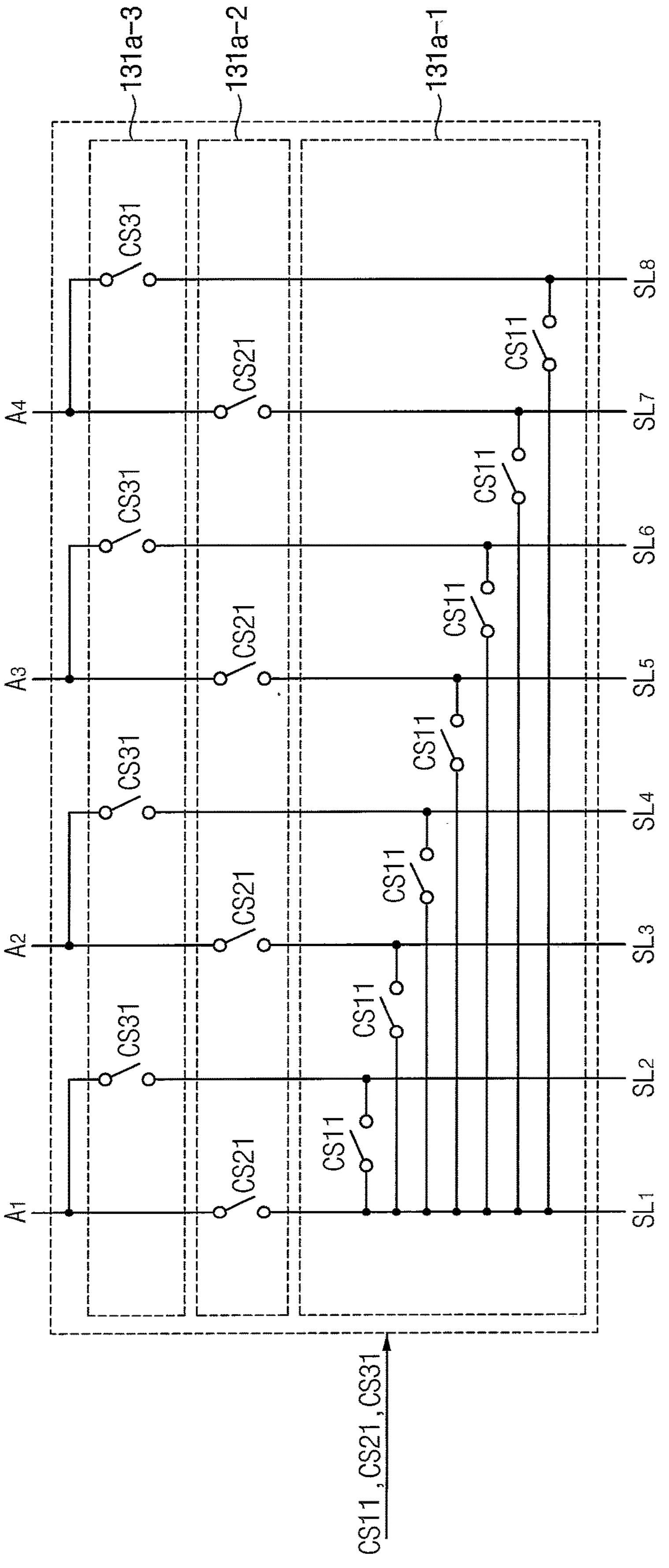
FIG. 17 is a block diagram illustrating an embodiment of a first switch circuit included in the display device of FIG. 16.

FIG. 16 is a block diagram illustrating a display device according to embodiments. FIG. 17 is a block diagram illustrating an embodiment of a first switch circuit included in the display device of FIG. 16.

In FIG. 16, the number of unit digital-to-analog converters included in a digital-to-analog converter 120a included in a display device 100a is only half the number of unit digital-to-analog converters included in the digital-to-analog converter 120 of the display device 100 of FIG. 1.

Referring to FIG. 16, the data latch circuit 110a may latch input digital data IDAT to provide digital data $D_1$, $D_2$, $D_3$, . . . , $D_{N/2}$ corresponding to one of a plurality of rows to the digital-to-analog converter 120a. The digital-to-analog converter 120a may convert the digital data $D_1$, $D_2$, $D_3$, . . . , $D_{N/2}$ to analog data $A_1$, $A_2$, $A_3$, . . . , $A_{N/2}$ and provide the analog data $A_1$, $A_2$, $A_3$, . . . , $A_{N/2}$ to a driving switch circuit 130a. The driving switch circuit 130a may provide the analog data $A_1$, $A_2$, $A_3$, . . . , $A_{N/2}$ as pixel data to a display panel through data pads 140.

The driving switch circuit 130a may include a plurality of switch circuits (e.g., a first switch circuit 131a to a $Q^{th}$ switch circuit 13Qa). Each of the plurality of switch circuits 131a to 13Qa may include a plurality of first switches, a plurality of second switches and a plurality of third switches.

A plurality of source lines $SL_1$, $SL_2$, $SL_3$, . . . , $SL_{N-1}$, $SL_N$ may be divided into a plurality of source line groups SGL_1, . . . , SLG_Q, and the plurality of first switches may electrically connect source lines included in each of the plurality of source line groups SLG_1, . . . , SLG_Q to one another based on each of a plurality of group switch control signals CS11 to CS1Q to perform charge sharing.

The plurality of second switches may electrically connect odd-numbered source lines included in each of the plurality of source line groups SLG_1, . . . , SLG_Q to the digital-to-analog converter 120 based on each of the plurality of group switch control signals CS21 to CS2Q.

The plurality of third switches may electrically connect even-numbered source lines included in each of the plurality of source line groups SLG_1, . . . , SLG_Q to the digital-to-analog converter 120 based on each of the plurality of group switch control signals CS31 to CS3Q.

According to the above configuration, the display device 100a may electrically connect source lines included in each of the plurality of source line groups SLG_1, . . . , SLG_Q to one another to perform the charge sharing based on the digital data RDAT1 and RDAT2 corresponding to each of the plurality of source line groups SLG_1, . . . , SLG_Q, the plurality of group switch control signals CS11 to CS1Q and the plurality of switch circuits 131a to 13Qa. The charge sharing may be performed based on parasitic capacitances formed in the source lines included in each of the plurality of source line groups SLG_1, . . . , SLG_Q.

In FIGS. 2A and 17, components having similar reference numerals perform similar functions (e.g., 131-1a and 131a-1, 131-2 and 131a-2). However, in FIG. 17, the first switch circuit 131c further includes a plurality of third switches 131a-3 compared to the first switch circuit 131a.

Referring to FIGS. 16 and 17, the first switch circuit 131c may receive analog data $A_1$, $A_2$, $A_3$ and $A_4$ converted from digital data $D_1$, $D_2$, $D_3$ and $D_4$, and provide the analog data $A_1$, $A_2$, $A_3$ and $A_4$ to first to eighth source lines $SL_1$ to $SL_8$ included in first source line group SLG_1, respectively.

The first switch circuit 131c may include a plurality of first switches 131a-1, a plurality of second switches 131a-2, and a plurality of third switches 131a-3.

The plurality of first switches 131a-1 may connect first to eight source lines $SL_1$ to $SL_8$ included in the first source line group SLG_1. The plurality of second switches 131a-2 and the plurality of third switches 131a-3 may connect the first to eighth source lines $SL_1$ to $SL_8$ to the digital-to-analog converter 120a, respectively.

The first switch circuit 131c may receive group switch control signals CS11, CS21 and CS31 from the charge sharing controller 170a.

In some embodiments, the plurality of first switches 131a-1 may be turned on or off based on the group switch control signal CS11, the plurality of second switches 131a-2 may be turned on or off based on the group switch control signal CS21 and the plurality of third switches 131a-3 may be turned on or off based on the group switch control signal CS31.

In some embodiments, each of the groups switch control signals CS11, CS21 and CS31 may be 1-bit signal, the plurality of first switches 131*a*-1, the plurality of second switches 131*a*-2, and the plurality of third switches 131*a*-3 may be turned on or off at once. However, time points at which the plurality of first switches 131*a*-1, the plurality of second switches 131*a*-2 and the plurality of third switches 131*a*-3 are turned on may be different from one another.

In FIG. 17, the first switch circuit 131*c* is illustrated as an example of a plurality of switch circuits included in the driving switch circuit 130*a*, however, the plurality of switch circuits other than the first switch circuit 131*c* may also have the same configuration as the first switch circuit 131*c*.

Figure 18:
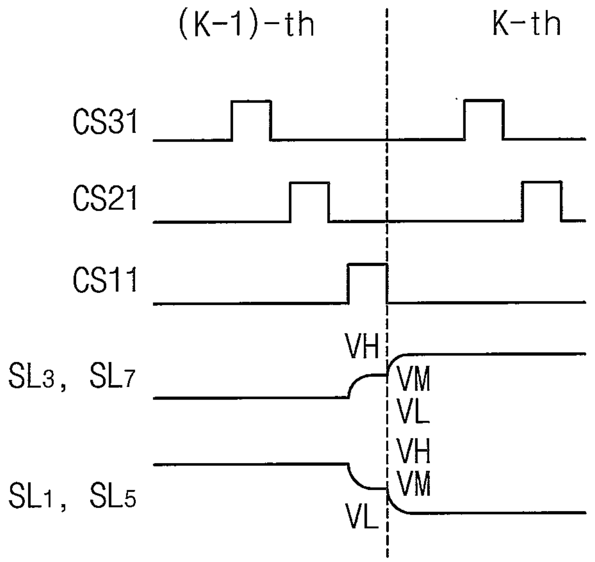
FIG. 18 is a timing diagram illustrating changes in voltage levels in group switch control signals and source lines in the display device of FIG. 16, according to an embodiment.

FIG. 18 is a timing diagram illustrating changes in voltage levels in group switch control signals and source lines in the display device of FIG. 16, according to an embodiment.

In FIG. 18, when charge sharing is performed before and after a $K^{th}$ row of the display panel is driven after a $(K-1)^{th}$ row of the display panel is driven, changes in voltage levels of group switch control signals CS11, CS21 and CS31 and source lines $SL_1$, $SL_3$, $SL_5$ and $SL_7$ are illustrated. Each of the time interval in which the $(K-1)^{th}$ row is driven and the time interval in which the $K^{th}$ row is driven may be referred to as a 'row unit time interval' described above with reference to FIG. 1.

Referring to FIG. 18, in the interval in which the $(K-1)^{th}$ row of the display panel is driven, voltage levels of the group switch control signal CS21 and the group switch control signal CS31 are alternately maintained at a logic high level while performing an original function of the display device for displaying an image on the display panel. In this case, the plurality of second switches 131*a*-2 and the plurality of third switches 131*a*-*c* described above with reference to FIG. 17 may be alternately turned on.

After displaying the image on the display panel, the voltage level of the group switch control signals CS21 and CS31 changes from the logic high level to a logic low level. When the plurality of first switches 131*a*-1 are turned on as described above with reference to FIG. 16, while the voltage level of the group switch control signals CS21 and CS31 are maintained at the logic low level, the voltage level of the group switch control signal CS11 may be maintained at the logic high level to perform the charge sharing.

In the in FIG. 18, when the charge sharing is performed, the source lines $SL_1$, $SL_3$, $SL_5$ and $SL_7$ corresponding to odd-numbered columns among the source lines $SL_1$ to $SL_8$ included in the first source line group SLG_1 are electrically connected to one another, respectively, and thus, the voltage level of each of the source lines $SL_1$, $SL_3$, $SL_5$ and $SL_7$ may be adjusted to be near the intermediate voltage level VM, which is a half of the maximum driving voltage level.

For example, the source lines $SL_3$ and $SL_7$ may be adjusted from near the minimum driving voltage level VL before the charge sharing is performed to near the intermediated voltage level VM while the charge sharing is performed, and may be adjusted to near the maximum driving voltage level VH after the charge sharing is performed. The source lines $SL_1$ and $SL_5$ may be adjusted from near the maximum driving voltage level VH before the charge sharing is performed to near the intermediated voltage level VM while the charge sharing is performed, and may be adjusted to near the minimum driving voltage level VL after the charge sharing is performed.

Figure 19:
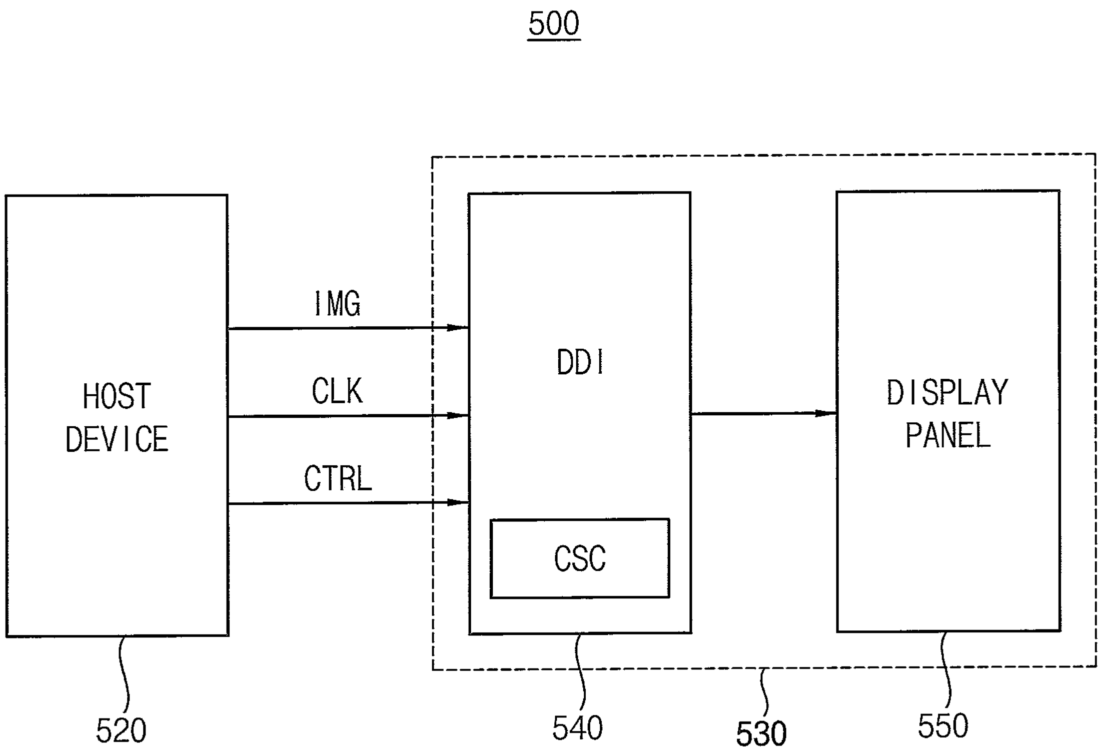
FIG. 19 is a block diagram illustrating a display system, according to embodiments.

FIG. 19 is a block diagram illustrating a display system according to embodiments.

A display system 500 in FIG. 19 may be various electronic devices having a function of image display such as a mobile phone, a smartphone, a tablet personal computer (PC), a personal digital assistant (PDA), a wearable device, a potable multimedia player (PMP), a handheld device, a handheld computer, and so on.

Referring to FIG. 19, the display system 500 may include a host device 520 and a display device 530. The display device 530 may include a display driving integrated circuit DDI 540 and a display panel 550.

The host device 520 may control overall operations of the display system 500. The host device 500 may be an application processor (AP), a baseband processor (BBP), a microprocessing unit (MPU), and so on. The host device 500 may provide image data IMG, a clock signal CLK and control signals CTRL to the display device 530. For example, the image data IMG may include RGB pixel values and have a resolution of w×h, where w is a number of pixels in a horizontal direction and h is a number of pixels in a vertical direction.

The control signals CTRL may include a command signal, a horizontal synchronization signal, a vertical synchronization signal, a data enable signal, and so on. For example, the image data IMG and the control signals CTRL may be provided, as a form of a packet, to the DDI 540 in the display device 530. The command signal may include control information, image information and/or display setting information. The image information may include, for example, a resolution of the input image data IMG. The display setting information may include, for example, panel information, a luminance setting value, and so on. For example, the host device 520 may provide, as the display setting information, information according to a user input or according to predetermined setting values, and provide the first reference values TH_MIN and TH_MAX and the second reference value TH_TOG described above with reference to FIGS. 5 and 6.

The DDI 540 may drive the display panel 550 based on the image data IMG and the control signals CTRL. The DDI 540 may convert the digital image signal IMG to analog signals, and drive the display panel 550 based on the analog signals. The image data IMG may be the input digital data IDAT described above with reference to FIG. 1, and the control signals CTRL may include the charge sharing control signal CCS described above with reference to FIG. 1.

The DDI 540 may include a charge sharing controller CSC, and the charge sharing controller CSC may be the charge sharing controller 170 and 170*a* described above with reference to FIGS. 1 and 16.

The display device 530 may perform charge sharing with respect to source lines included in a first source line group among a plurality of source line groups, and then, perform the charge sharing with respect to source lines included in a second source line group different from the first source line group among the plurality of source line groups.

Figure 20:
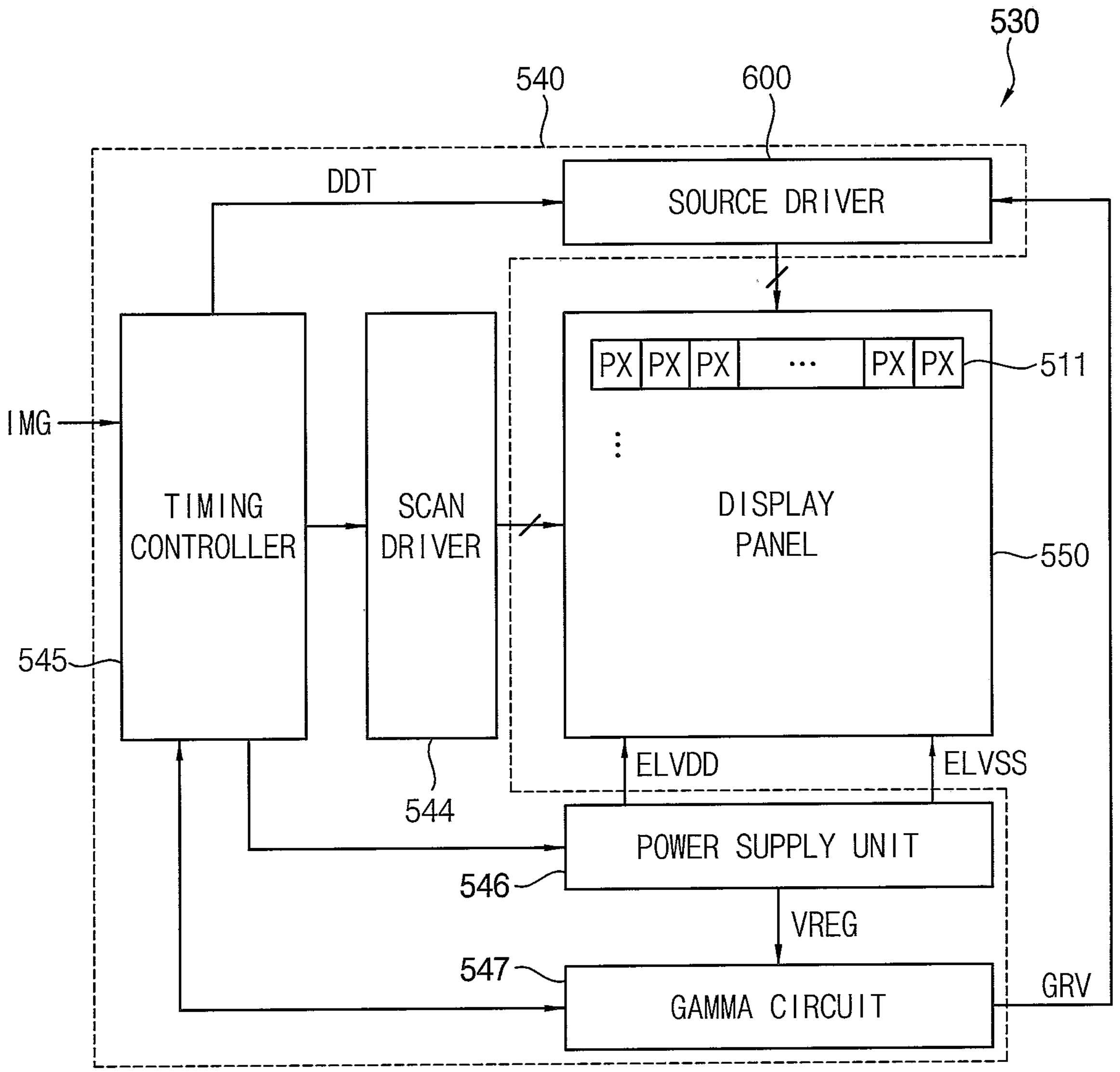
FIG. 20 is a block diagram illustrating a display device, according to embodiments.

FIG. 20 is a block diagram illustrating a display device according to embodiments.

FIG. 20 illustrates, as an example, an electroluminescence display device such as an OLED display device, and embodiments are not limited to a specific kind of a display device.

Referring to FIG. 20, an electroluminescent display device 530 may include a display panel 550 including a plurality of pixel rows 511 and a DDI 530 that drives the display panel 550. The DDI 540 may include a data driver or a source driver 600, a scan driver 544, a timing controller 545, a power supply unit 546, and a gamma circuit 547.

The display panel 550 may be connected to the source driver 600 of the DDI 540 through a plurality of source lines, and may be connected to the scan driver 544 of the DDI 540 through a plurality of scan lines. The display panel 550 may include the pixel rows 511. That is, the display panel 550 may include a plurality of pixels PX arranged in a matrix having a plurality of rows and a plurality of columns. One row of pixels PX connected to the same scan line may be referred to as one pixel row 511. In some embodiments, the display panel 550 may be a self-emitting display panel that emits light without the use of a back light unit. For example, the display panel 550 may be an organic light-emitting diode (OLED) display panel.

Each pixel PX included in the display panel 550 may have various configurations according to a driving scheme of the display device 530. For example, the electroluminescent display device 530 may be driven with an analog or a digital driving method. While the analog driving method produces grayscale using variable voltage levels corresponding to input data, the digital driving method produces grayscale using variable time duration in which the LED emits light. The analog driving method is difficult to implement because the analog driving method uses a DDI that is complicated to manufacture if the display is large and has high resolution. The digital driving method, on the other hand, may readily accomplish high resolution through a simpler circuit structure. As the size of the display panel becomes larger and the resolution increases, the digital driving method may have more favorable characteristics over the analog driving method. The display device according to embodiments may be applied to both of the analog driving method and the digital driving method.

The source driver 600 may apply a data signal to the display panel 550 through the source lines based on display data DDT. The scan driver 544 may apply a scan signal to the display panel 550 through the scan lines.

The timing controller 545 may control the operation of the display device 530. The timing controller 545 may provide predetermined control signals to the source driver 600 and the scan driver 544 to control the operations of the display device 543. In some embodiments, the source driver 600, the scan driver 544 and the timing controller 545 may be implemented as one integrated circuit (IC). In other embodiments, the source driver 600, the scan driver 544 and the timing controller 545 may be implemented as two or more integrated circuits. A driving module including at least the timing controller 545 and the source driver 600 may be referred to as a timing controller embedded data driver (TED).

The timing controller 545 may receive the image data IMG and the input control signals from the host device 520 in FIG. 19. For example, the image data IMG may include red (R) image data, green (G) image data and blue (B) image data. According to embodiments, the image data IMG may include white image data, magenta image data, yellow image data, cyan image data, and so on. The input control signals may include a master clock signal, a data enable signal, a horizontal synchronization signal, a vertical synchronization signal, and so on.

The power supply unit 546 may supply the display panel 550 with a high power supply voltage ELVDD and a low power supply voltage ELVSS. In addition, the power supply unit 546 may supply a regulator voltage VREG to the gamma circuit 547. The gamma circuit 547 may generate gamma reference voltages GRV based on the regulator voltage VREG. For example, the regulator voltage VREG may be the high power supply voltage ELVDD or another voltage that is generated based on the high power supply voltage ELVDD.

As described above, a display device according to embodiments may electrically connect source lines included in each of a plurality of source line groups to perform charge sharing based on a digital data corresponding to each of the plurality of source line groups, a plurality of group switch control signals and a plurality of switch circuits. The charge sharing may be performed based on parasitic capacitances formed in source lines included in each of the plurality of source line groups. The display device may perform the charge sharing without additional data other than the input digital data for displaying an image on the display panel. The display device may perform the charge sharing using general components for performing an original function of the display device without additional components other than a charge sharing controller and a plurality of first switches.

Embodiments may be usefully used in a display device and a system including the display device. For example, embodiments may be more usefully applied to a computer, a laptop, a cellular phone, a smart phone, a personal digital assistant (PDA), a portable multimedia player (PMP), a digital TV, digital camera, portable game console, a navigation device, a wearable device, an IoT (internet of things) device, an IoE (internet of everything) device, an e-book, a virtual reality (VR) devices, an augmented reality (AR) devices, an in-vehicle navigation systems, a video phones, a surveillance systems, an automatic focus systems, a tracking systems, a motion detection systems and the like.

The foregoing is illustrative of embodiments and is not to be construed as limiting thereof. Although some embodiments have been described, those skilled in the art will readily appreciate that many modifications are possible in the embodiments without materially departing from the novel teachings and advantages of the embodiments. Accordingly, all such modifications are intended to be included within the scope of the embodiments as defined in the claims. Therefore, it is to be understood that the foregoing is illustrative of one or more embodiments and is not to be construed as limited to the specific embodiments disclosed, and that modifications to the disclosed embodiments, as well as other embodiments, are intended to be included within the scope of the appended claims.

What is claimed is:

1. A display device comprising:

a display panel comprising a plurality of pixels which are connected to a plurality of gate lines and a plurality of source lines, and are arranged in a plurality of rows and a plurality of columns;

a plurality of switch circuits configured to electrically connect source lines, included in each of a plurality of source line groups of the plurality of source lines, to one another based on each of a plurality of group switch control signals to perform charge sharing; and a charge sharing controller configured to generate each of the plurality of group switch control signals based on first bits of each of a plurality of $(K-1)^{th}$ digital data groups and second bits of each of a plurality of $K^{th}$ digital data groups, wherein the plurality of $(K-1)^{th}$ digital data groups correspond to pixel values of a $(K-1)^{th}$ row of the display panel, the plurality of $K^{th}$ data digital groups correspond to pixel values of a $K^{th}$ row of the display panel, where K is a natural number greater than one, wherein the charge sharing controller is configured to, with respect to each of the plurality of source line groups, activate each of the plurality of group switch control signals to perform the charge sharing in response to the first bits satisfying a first condition, and the first bits and the second bits satisfying a second condition, and wherein the first bits and the second bits are not compared to each other to output a count value.

2. The display device of claim 1, wherein the charge sharing controller is configured to, with respect to each of the plurality of source line groups, deactivate each of the plurality of group switch control signals to not perform the charge sharing in response to the first bits not satisfying the first condition, or the first bits and the second bits not satisfying the second condition.

3. The display device of claim 1, wherein each of the plurality of switch circuits includes a plurality of first switches configured to perform the charge sharing; and wherein the charge sharing controller is configured to, with respect to each of the plurality of source line groups, activate each of the plurality of group switch control signals to turn on the plurality of first switches in response to the first bits satisfying the first condition, and the first bits and the second bits satisfying the second condition.

4. The display device of claim 3, wherein the charge sharing controller is configured to, with respect to each of the plurality of source line groups, deactivate each of the plurality of group switch control signals to turn off the plurality of first switches in response to the first bits not satisfying the first condition, or the first bits and the second bits not satisfying the second condition.

5. The display device of claim 1, wherein third bits are the first bits corresponding to pixels in selected columns among the plurality of columns, and fourth bits are the second bits corresponding to the selected columns; and wherein the charge sharing controller is configured to, with respect to each of the plurality of source line groups, activate each of the plurality of group switch control signals to perform the charge sharing corresponding to the selected columns in response to the third bits satisfying a third condition, and the third bits and the fourth bits satisfying a fourth condition.

6. The display device of claim 5, wherein the third bits and the fourth bits are not compared to each other to output the count value.

7. The display device of claim 6, wherein the selected columns are odd-numbered columns.

8. The display device of claim 7, wherein red pixels and blue pixels of the plurality of pixels are arranged in the odd-numbered columns, and green pixels of the plurality of pixels are arranged in even-numbered columns.

9. The display device of claim 5, wherein the charge sharing controller is configured to, with respect to each of the plurality of source line groups, deactivate each of the plurality of group switch control signals to not perform the charge sharing corresponding to the selected columns in response to the third bits not satisfying the third condition, or the third bits and the fourth bits not satisfying the fourth condition.

10. The display device of claim 1, wherein each of the plurality of switch circuits includes a plurality of first switches configured to perform the charge sharing; and wherein the plurality of first switches is configured to connect a reference source line, which is one source line of the source lines included in each of the plurality of source line groups, respectively to the other source lines of the source lines included in each of the plurality of source line groups, subject to the first condition and the second condition.

11. The display device of claim 10, further comprising a digital-to-analog converter configured to convert digital data to analog data, and wherein each of the plurality of switch circuits further include a plurality of second switches configured to connect the source lines included in each of the plurality of source line groups to the digital-to-analog converter.

12. The display device of claim 11, wherein the charge sharing controller is configured to determine whether the first condition and the second condition are satisfied in each of a plurality of row-unit time intervals for driving the display panel row by row.

13. The display device of claim 12, wherein a time point at which the plurality of first switches are turned on is after a time point at which the plurality of second switches are turned on in each of the plurality of row-unit time intervals.

14. The display device of claim 1, wherein each of the plurality of switch circuits connects two adjacent source lines among the source lines included in each of the plurality of source line groups.

15. A display device comprising:

a display panel comprising a plurality of pixels which are connected to a plurality of gate lines and a plurality of source lines, and are arranged in a plurality of rows and a plurality of columns; and a display driver integrated circuit configured to drive the display panel, the display driver integrated circuit comprising:

a plurality of switch circuits configured to electrically connect source lines, included in each of a plurality of source line groups of the plurality of source lines, to one another based on each of a plurality of group switch control signals to perform charge sharing;

a data latch circuit configured to output a plurality of $(K-1)^{th}$ digital data groups corresponding to pixel values of a $(K-1)^{th}$ row of the display panel, and a plurality of $K^{th}$ digital data groups corresponding to pixel values of a $K^{th}$ row of the display panel, where K is a natural number greater than one; and a charge sharing controller configured to generate each of the plurality of group switch control signals based on first bits of each of the plurality of $(K-1)^{th}$ digital data groups and second bits of each of the plurality of $K^{th}$ digital data groups, wherein the charge sharing controller is configured to, with respect to each of the plurality of source line groups, activate each of the plurality of group switch control signals to perform the charge sharing in response to the first bits satisfying a first condition, and the first bits and the second bits satisfying a second condition, and wherein the first bits and the second bits are not compared to each other to output a count value.

16. The display device of claim 15, wherein the charge sharing controller is configured to, with respect to each of the plurality of source line groups, deactivate each of the plurality of group switch control signals to not perform the charge sharing in response to the first bits not satisfying the first condition, or the first bits and the second bits not satisfying the second condition.

17. The display device of claim 15, wherein each of the plurality of switch circuits includes a plurality of first switches configured to perform the charge sharing; and wherein the charge sharing controller is configured to, with respect to each of the plurality of source line groups, activate each of the plurality of group switch control signals to turn on the plurality of first switches in response to the first bits satisfying the first condition, and the first bits and the second bits satisfying the second condition.

18. The display device of claim 17, wherein the charge sharing controller is configured to, with respect to each of the plurality of source line groups, deactivate each of the plurality of group switch control signals to turn off the plurality of first switches in response to the first bits not satisfying the first condition, or the first bits and the second bits not satisfying the second condition.

19. The display device of claim 15, wherein third bits are the first bits corresponding to pixels in selected columns among the plurality of columns, and fourth bits are the second bits corresponding to the selected columns; and wherein the charge sharing controller is configured to, with respect to each of the plurality of source line groups, activate each of the plurality of group switch control signals to perform the charge sharing corresponding to the selected columns in response to the third bits satisfying a third condition, and the third bits and the fourth bits satisfying a fourth condition.

20. The display device of claim 19, wherein the third bits and the fourth bits are not compared to each other to output the count value.

* * * * *